(12) United States Patent
Liu et al.

(10) Patent No.: US 10,091,038 B2
(45) Date of Patent: Oct. 2, 2018

(54) MODULATION AND DETECTION OF SYMBOLS WITH VARIED PHASE ROTATION

(71) Applicant: Huawei Technologies Co., Ltd., Shenzhen (CN)

(72) Inventors: Yalin Liu, Shanghai (CN); Peter Loc, Cupertino, CA (US); Tianyu Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 15/169,928

(22) Filed: Jun. 1, 2016

(65) Prior Publication Data

US 2016/0277224 A1  Sep. 22, 2016

Related U.S. Application Data

(63) Continuation of application No. PCT/CN2013/090674, filed on Dec. 27, 2013.

(51) Int. Cl.
*H04L 27/18* (2006.01)
*H04L 27/26* (2006.01)
(Continued)

(52) U.S. Cl.
CPC ............ *H04L 27/18* (2013.01); *H04L 5/0048* (2013.01); *H04L 27/0012* (2013.01);
(Continued)

(58) Field of Classification Search
CPC ..... H04L 12/26; H04L 27/18; H04L 27/0012; H04L 27/0008; H04L 69/22; H04L 27/261; H04L 27/186; H04L 27/20; H04L 5/0048
See application file for complete search history.

(56) References Cited

U.S. PATENT DOCUMENTS

| 8,228,806 B2 | 7/2012 | Pare, Jr. et al. |
| 2009/0092174 A1 | 4/2009 | Wang |

(Continued)

FOREIGN PATENT DOCUMENTS

| CN | 101494629 A | 7/2009 |
| CN | 101796748 A | 8/2010 |

(Continued)

OTHER PUBLICATIONS

"Part 11: Wireless LAN Medium Access Control (MAC) and Physical Layer (PHY) Specifications," IEEE Standard for Information Technology—Telecommunications and Information Exchange between Systems Local and Metropolitan Area Networks—Specific Requirements, IEEE Computer Society, IEEE Std 802.11—2012, 2695 pages.

(Continued)

*Primary Examiner* — Michelle M Koeth
(74) *Attorney, Agent, or Firm* — Slater Matsil, LLP

(57) ABSTRACT

Embodiments provide a signal transmission method and apparatus. The method includes: modulating, by using a phase-shift keying PSK scheme with rotation of a first angle, at least a part of pilot information carried in at least one signaling symbol in a signaling field of a data packet, to obtain modulated pilot information; and sending, to a receive end, a data packet that carries the modulated pilot information. A modulation scheme different from a conventional modulation scheme is used in the embodiments to modulate pilot information carried in a signaling symbol in a signaling field of a data packet, so that a data packet format corresponding to the modulation scheme can be effectively detected at a receive end.

20 Claims, 12 Drawing Sheets

(51) Int. Cl.
  *H04L 5/00* (2006.01)
  *H04L 27/20* (2006.01)
  *H04L 27/00* (2006.01)
  *H04L 29/06* (2006.01)
(52) U.S. Cl.
  CPC .......... *H04L 27/186* (2013.01); *H04L 27/20* (2013.01); *H04L 27/261* (2013.01); *H04L 69/22* (2013.01)

(56) References Cited

U.S. PATENT DOCUMENTS

| | | |
|---|---|---|
| 2010/0284491 A1 | 11/2010 | Chen et al. |
| 2010/0315952 A1 | 12/2010 | Pare, Jr. et al. |
| 2010/0315953 A1* | 12/2010 | Pare, Jr. ............. H04L 27/0012 370/241 |
| 2011/0096685 A1* | 4/2011 | Lee .................... H04L 27/0012 370/252 |
| 2011/0110348 A1* | 5/2011 | Lee .................... H04L 27/2613 370/338 |
| 2011/0206156 A1* | 8/2011 | Lee .......................... H04L 27/18 375/279 |
| 2015/0071372 A1* | 3/2015 | Zhang ................ H04L 27/2602 375/295 |
| 2015/0117227 A1* | 4/2015 | Zhang .................. H04L 1/0057 370/245 |
| 2015/0117428 A1* | 4/2015 | Lee ....................... H04L 27/206 370/338 |
| 2015/0139206 A1* | 5/2015 | Azizi ..................... H04L 5/003 370/338 |
| 2016/0050093 A1* | 2/2016 | Choi .................. H04L 27/2602 375/308 |
| 2016/0205565 A1 | 7/2016 | Liu et al. |

FOREIGN PATENT DOCUMENTS

| | | |
|---|---|---|
| CN | 101924731 A | 12/2010 |
| CN | 102833043 A | 12/2012 |

OTHER PUBLICATIONS

"Part 11: Wireless LAN Medium Access Control (MAC) and Physical Layer (PHY) Specifications, Amendment 4: Enhancements for Very High Throughput for Operation in Bands Below 6 GHz," IEEE Standard for Information Technology—Telecommunications and Information Exchange between Systems Local and Metropolitan Area Networks—Specific Requirements, IEEE Computer Society, IEEE Std 802.11ac—2013, 425 pages.

Ponnampalam, V. et al., "11ac Auto-Detection Using the VHT-SIG-A Field," IEEE 802.11-10/0750r0, Jul. 5, 2010, 14 pages.

\* cited by examiner

MODULATION AND DETECTION OF SYMBOLS WITH VARIED PHASE ROTATION

CROSS-REFERENCE TO RELATED APPLICATIONS

This application is a continuation of International Patent Application No. PCT/CN2013/090674, filed on Dec. 27, 2013, which is hereby incorporated by reference in its entirety.

TECHNICAL FIELD

Embodiments relate to the field of communications technologies, and more specifically, to a signal transmission method and apparatus.

BACKGROUND

With wide application of intelligent terminals, people have a growing requirement for data network traffic. To meet people's increasing network requirements and improve system performance, systems and standards of wireless local area networks (Wireless Local Area Networks, WLANs) experience multiple evolutions. For example, in a Wi-Fi system, a standard of the Wi-Fi system sequentially evolves from Institute of Electrical and Electronics Engineers (IEEE) 802.11a/b to IEEE 802.11g, IEEE 802.11n, and even to IEEE 802.11ac.

In the 802.11n standard, two physical-layer frame formats are defined for a data packet: an HT mixed format and an HT Greenfield (Greenfield) format. In the 802.11ac standard, a very high throughput (VHT) format is defined. A signaling field of a data packet with legacy format uses a binary phase shift keying (BPSK) modulation scheme, a signaling field of a high throughput data packet uses a quadtrature BPSK (QBPSK) modulation scheme, and a signaling field of a very high throughput data packet uses BPSK and QBPSK modulation schemes.

Currently, the IEEE 802.11 Working Group has further founded a High Efficiency Wireless Local Area Network Study Group (High Efficiency WLAN Study Group, HEW SG). An objective of the High Efficiency Wireless Local Area Network Study Group is to construct a next-generation wireless local area network to increase spectral frequency and further improve a system throughput and a regional throughput, so as to provide a better service for users. The High Efficiency Wireless Local Area Network Study Group has introduced a data packet in a new format, that is, a data packet in a HEW format.

When transmitting a data packet, a transmit end modulates information (for example, pilot information and signaling information) carried in the data packet. A receive end may detect information that uses different modulation schemes, so as to determine a corresponding format of the data packet.

SUMMARY

Embodiments presented herein provide a signal transmission method and apparatus, which can use a new modulation scheme to modulate pilot information carried in a data packet.

According to a first aspect, a signal transmission method is provided, including: modulating, by using a phase-shift keying PSK scheme with rotation of a first angle, at least a part of pilot information carried in at least one symbol of a data packet, to obtain modulated pilot information; and sending, to a receive end, a data packet that carries the modulated pilot information.

With reference to the first aspect, in a first possible implementation manner, the modulating, by using a phase-shift keying PSK scheme with rotation of a first angle, at least a part of pilot information carried in at least one symbol of a data packet, to obtain modulated pilot information includes: modulating, by using a BPSK scheme with rotation of the first angle, at least a part of the pilot information carried in the at least one symbol of the data packet, to obtain the modulated pilot information.

With reference to the first possible implementation manner, in a second possible implementation manner, the modulating, by using a binary phase-shift keying BPSK scheme with rotation of the first angle, at least a part of the pilot information carried in the at least one symbol of the data packet, to obtain the modulated pilot information includes: modulating, by using the binary phase-shift keying BPSK scheme with rotation of the first angle, at least a part of pilot information carried in at least one signaling symbol in a signaling field of the data packet, to obtain the modulated pilot information.

With reference to the second possible implementation manner, in a third possible implementation manner, the modulating, by using the binary phase-shift keying BPSK scheme with rotation of the first angle, at least a part of pilot information carried in at least one signaling symbol in a signaling field of the data packet includes: modulating, by using the BPSK scheme with rotation of the first angle, all pilot information carried in one signaling symbol or two signaling symbols in the signaling field of the data packet.

With reference to the second possible implementation manner, in a fourth possible implementation manner, the modulating, by using the binary phase-shift keying BPSK scheme with rotation of the first angle, at least a part of pilot information carried in at least one signaling symbol in a signaling field of the data packet includes: modulating, by using the BPSK scheme with rotation of the first angle, all pilot information carried in all signaling symbols in the signaling field of the data packet.

With reference to the second possible implementation manner, in a fifth possible implementation manner, the modulating, by using the binary phase-shift keying BPSK scheme with rotation of the first angle, at least a part of pilot information carried in at least one signaling symbol in a signaling field of the data packet includes: modulating, by using the BPSK scheme with rotation of the first angle, a part of pilot information carried in each signaling symbol of the at least one signaling symbol, where the method according to the first aspect further includes: modulating, by using a BPSK scheme with rotation of a second angle, another part of the pilot information carried in each signaling symbol of the at least one signaling symbol.

With reference to the second possible implementation manner, in a sixth possible implementation manner, the method according to the first aspect further includes: modulating, by using a BPSK scheme with rotation of a second angle, pilot information carried in another signaling symbol except the at least one signaling symbol in the signaling field of the data packet.

With reference to the sixth possible implementation manner, in a sixth possible implementation manner, the modulating, by using the binary phase-shift keying BPSK scheme with rotation of the first angle, at least a part of pilot information carried in at least one signaling symbol in a signaling field of the data packet includes: modulating, by using a binary phase-shift keying BPSK scheme with rotation of 90 degrees, pilot information carried in a first signaling symbol, where the modulating, by using a BPSK scheme with rotation of a second angle, pilot information carried in another signaling symbol except the at least one signaling symbol in the signaling field of the data packet includes: modulating, by using a binary phase-shift keying BPSK scheme with rotation of 90 degrees, 45 degrees, or 0 degrees, pilot information carried in a second signaling symbol.

With reference to any one of the second to seventh possible implementation manners, in an eighth possible implementation manner, the modulating, by using the binary phase-shift keying BPSK scheme with rotation of the first angle, at least a part of pilot information carried in at least one signaling symbol in a signaling field of the data packet includes: modulating, by using a binary phase-shift keying BPSK scheme with a rotation angle of $\beta_{i,j}$, pilot information carried in the $j^{th}$ pilot subcarrier in the $i^{th}$ signaling symbol in the signaling field of the data packet, where i= 1, 2, 3 . . . I, j=1, 2, 3 . . . J, I is a quantity of signaling symbols in the data packet, J is a quantity of pilot subcarriers in each signaling symbol of the at least one signaling symbol, and at least one of the rotation angle $\beta_{i,j}$ is the first angle.

With reference to any one of the second to seventh possible implementation manners, in a ninth possible implementation manner, the method according to the first aspect further includes: modulating, by using a binary phase-shift keying BPSK scheme with rotation of a third angle, at least a part of signaling information carried in the at least one signaling symbol in the signaling field of the data packet, to obtain modulated signaling information, where the sending, to a receive end, a data packet that carries the modulated pilot information includes: sending, to the receive end, a data packet that carries the modulated pilot information and the modulated signaling information.

With reference to any one of the second to ninth possible implementation manners, in a tenth possible implementation manner, a format of the data packet is a high efficiency wireless local area network HEW format, the signaling field is a signaling field in a physical layer conformance procedure (PLCP) protocol data unit (PPDU) frame of the data packet, the at least one signaling symbol is at least one of HEW SIG A1 and HEW SIG A2, and the HEW SIG A1 and the HEW SIG A2 are respectively a first signaling symbol and a second signaling symbol that follow an L-SIG symbol in the PPDU frame.

With reference to any one of the second to ninth possible implementation manners, in an eleventh possible implementation manner, the signaling field is a signaling field in an advanced wireless system AWS, and the at least one signaling symbol is at least one of AWS-SIG1 and AWS-SIG2.

With reference to any one of the foregoing possible implementation manners of the first aspect, in a ninth possible implementation manner, the first angle is N*45 degrees and N is a positive integer.

According to a second aspect, a signal transmission method is provided, including: receiving a data packet sent by a transmit end, where the data packet carries modulated pilot information, and at least a part of pilot information carried in at least one symbol of the data packet is modulated by using a phase-shift keying PSK scheme with rotation of a first angle; and detecting the modulated pilot information to determine that a format of the data packet is a data packet format corresponding to the PSK scheme with rotation of the first angle.

With reference to the second aspect, in a first possible implementation manner, the phase-shift keying scheme is a binary phase-shift keying BPSK scheme, where the detecting the modulated pilot information to determine that a format of the data packet is a data packet format corresponding to the PSK scheme with rotation of the first angle includes: detecting the modulated pilot information to determine that the format of the data packet is a data packet format corresponding to a BPSK scheme with rotation of the first angle.

With reference to the first possible implementation manner, in a second possible implementation manner, the at least one symbol is at least one signaling symbol in a signaling field of the data packet.

With reference to the second possible implementation manner of the second aspect, in a third possible implementation manner, all pilot information carried in one signaling symbol or two signaling symbols in the signaling field of the data packet is modulated by using the BPSK scheme with rotation of the first angle.

With reference to the second possible implementation manner of the second aspect, in a fourth possible implementation manner, all pilot information carried in all signaling symbols in the signaling field of the data packet is modulated by using the BPSK scheme with rotation of the first angle.

With reference to the second possible implementation manner of the second aspect, in a fifth possible implementation manner, a part of pilot information carried in each signaling symbol of the at least one signaling symbol is modulated by using the BPSK scheme with rotation of the first angle, and another part of the pilot information carried in each signaling symbol of the at least one signaling symbol is modulated by using a BPSK scheme with rotation of a second angle.

With reference to the second possible implementation manner of the second aspect, in a sixth possible implementation manner, pilot information carried in another signaling symbol except the at least one signaling symbol in the signaling field of the data packet is modulated by using a BPSK scheme with rotation of a second angle.

With reference to the sixth possible implementation manner of the second aspect, in a seventh possible implementation manner, pilot information carried in a first signaling symbol in the signaling field of the data packet is modulated by using a binary phase-shift keying BPSK scheme with rotation of 90 degrees, and pilot information carried in a second signaling symbol in the signaling field of the data packet is modulated by using a binary phase-shift keying BPSK scheme with rotation of 90 degrees, 45 degrees, or 0 degrees.

With reference to any one of the second to seventh possible implementation manners of the second aspect, in an eighth possible implementation manner, the detecting the modulated pilot information to determine that the format of the data packet is a data packet format corresponding to a BPSK scheme with rotation of the first angle includes: detecting a real part component and an imaginary part component of the pilot information and comparing a result of the detection with a preset threshold to determine that the format of the data packet is the data packet format corresponding to the BPSK scheme with rotation of the first angle.

With reference to the eighth possible implementation manner of the second aspect, in a ninth possible implementation manner, the detecting a real part component and an imaginary part component of the pilot information and comparing a result of the detection with a preset threshold to determine that the format of the data packet is the data packet format corresponding to the BPSK scheme with rotation of the first angle includes: performing, according to the following formula, an operation on a real part and an imaginary part of modulated pilot information of one of the at least one signaling symbol carried in the signaling field of the data packet, to obtain the result of the detection:

$$S = \sum_{j=1}^{J} (a_j^2 - b_j^2),$$

where $a_j$ is a real part component of modulated pilot information carried in the $j^{th}$ pilot subcarrier in the $i^{th}$ signaling symbol, $b_j$ is an imaginary part component of the modulated pilot information carried in the $j^{th}$ pilot subcarrier in the $i^{th}$ signaling symbol, $j=1, 2, 3 \ldots J$, and J is a quantity of pilot subcarriers in each signaling symbol of the at least one signaling symbol; comparing the result S of the detection with a first threshold; and if the result S of the detection is less than the first threshold, determining that the format of the data packet is the data packet format corresponding to the binary phase-shift keying scheme with rotation of the first angle.

With reference to the eighth possible implementation manner of the second aspect, in a tenth possible implementation manner, pilot information carried in the $j^{th}$ pilot subcarrier in the $i^{th}$ signaling symbol in the signaling field of the data packet is modulated by using a binary phase-shift keying BPSK scheme with a rotation angle of $\beta_{i,j}$, where $i=1, 2, 3 \ldots I$, $j=1, 2, 3 \ldots J$, I is a quantity of signaling symbols in the data packet, J is a quantity of pilot subcarriers in each signaling symbol of the at least one signaling symbol, and any one of the rotation angle $\beta_{i,j}$ is the first angle, where the detecting a real part component and an imaginary part component of the pilot information and comparing a result of the detection with a preset threshold to determine that the format of the data packet is the data packet format corresponding to the BPSK scheme with rotation of the first angle includes: performing, according to the following formula, an operation on a real part and an imaginary part of the modulated pilot information carried in the signaling field of the data packet, to obtain the result of the detection:

$$S = \sum_{i=1}^{I} \sum_{j=1}^{J} (a_{ij}^2 - b_{ij}^2),$$

where $a_{ij}$ is a real part component of modulated pilot information carried in the $j^{th}$ pilot subcarrier in the $i^{th}$ signaling symbol, and $b_{ij}$ is an imaginary part component of the modulated pilot information carried in the $j^{th}$ pilot subcarrier in the $i^{th}$ signaling symbol; comparing the result S of the detection with a first threshold; and if the result S of the detection is less than the first threshold, determining that the format of the data packet is the data packet format corresponding to the binary phase-shift keying scheme with rotation of the first angle.

With reference to any one of the second to tenth possible implementation manners of the second aspect, in an eleventh possible implementation manner, the method according to the second aspect further includes: receiving a second data packet, where a signaling field of the second data packet carries pilot information modulated by using the binary phase-shift keying BPSK scheme; and detecting the pilot information modulated by using the binary phase-shift keying BPSK scheme, to determine that a format of the second data packet is a data packet format corresponding to the BPSK scheme.

With reference to any one of the second to eleventh possible implementation manners of the second aspect, in a twelfth possible implementation manner, a format of the data packet is a high efficiency wireless local area network HEW format, the signaling field is a signaling field in a physical layer conformance procedure (PLCP) protocol data unit (PPDU) frame of the data packet, the at least one signaling symbol is at least one of HEW SIG A1 and HEW SIG A2, and the HEW SIG A1 and the HEW SIG A2 are respectively a first signaling symbol and a second signaling symbol that follow an L-SIG symbol in the PPDU frame.

With reference to any one of the second to eleventh possible implementation manners of the second aspect, in a thirteenth possible implementation manner, the signaling field is a signaling field in an advanced wireless system (AWS), and the at least one signaling symbol is at least one of AWS-SIG1 and AWS-SIG2.

With reference to any one of the foregoing possible implementation manners of the second aspect, in a fourteenth possible implementation manner, the first angle is N*45 degrees and N is a positive integer.

According to a third aspect, a signal transmission apparatus is provided, including: a modulation module, configured to modulate, by using a phase-shift keying PSK scheme with rotation of a first angle, at least a part of pilot information carried in at least one symbol of a data packet, to obtain modulated pilot information; and a sending module, configured to send, to a receive end, a data packet that carries the modulated pilot information.

With reference to the third aspect, in a first possible implementation manner, the modulation module modulates, by using a binary phase-shift keying BPSK scheme with rotation of the first angle, at least a part of the pilot information carried in the at least one symbol of the data packet, to obtain the modulated pilot information.

With reference to the first possible implementation manner of the third aspect, in a second possible implementation manner, the modulation module modulates, by using the binary phase-shift keying BPSK scheme with rotation of the first angle, at least a part of pilot information carried in at least one signaling symbol in a signaling field of the data packet, to obtain the modulated pilot information.

With reference to the second possible implementation manner of the third aspect, in a third possible implementation manner, the modulation module modulates, by using the BPSK scheme with rotation of the first angle, all pilot information carried in one signaling symbol or two signaling symbols in the signaling field of the data packet.

With reference to the second possible implementation manner of the third aspect, in a fourth possible implementation manner, the modulation module modulates, by using the BPSK scheme with rotation of the first angle, all pilot information carried in all signaling symbols in the signaling field of the data packet.

With reference to the second possible implementation manner of the third aspect, in a fifth possible implementation manner, the modulation module modulates, by using the BPSK scheme with rotation of the first angle, a part of pilot information carried in each signaling symbol of the at least one signaling symbol, and modulates, by using a BPSK scheme with rotation of a second angle, another part of the pilot information carried in each signaling symbol of the at least one signaling symbol.

With reference to the second possible implementation manner of the third aspect, in a sixth possible implementation manner, the modulation module further modulates, by using a BPSK scheme with rotation of a second angle, pilot information carried in another signaling symbol except the at least one signaling symbol in the signaling field of the data packet.

With reference to the sixth possible implementation manner of the third aspect, in a seventh possible implementation manner, the modulation module modulates, by using a binary phase-shift keying BPSK scheme with rotation of 90 degrees, pilot information carried in a first signaling symbol, and modulates, by using a binary phase-shift keying BPSK scheme with rotation of 90 degrees, 45 degrees, or 0 degrees, pilot information carried in a second signaling symbol.

With reference to any one of the second possible implementation manner to the seventh possible implementation manner of the third aspect, in an eighth possible implementation manner, the modulation module modulates, by using a binary phase-shift keying BPSK scheme with a rotation angle of $\beta_{i,j}$, pilot information carried in the $j^{th}$ pilot subcarrier in the $i^{th}$ signaling symbol in the signaling field of the data packet, where i=1, 2, 3 . . . I, j=1, 2, 3 . . . J, I is a quantity of signaling symbols in the data packet, J is a quantity of pilot subcarriers in each signaling symbol of the at least one signaling symbol, and at least one of the rotation angle $\beta_{i,j}$ is the first angle.

With reference to any one of the second possible implementation manner to the seventh possible implementation manner of the third aspect, in a ninth possible implementation manner, the modulation module further modulates, by using a binary phase-shift keying BPSK scheme with rotation of a third angle, at least a part of signaling information carried in the at least one signaling symbol in the signaling field of the data packet, to obtain modulated signaling information, where the sending module sends, to the receive end, a data packet that carries the modulated pilot information and the modulated signaling information.

With reference to any one of the foregoing possible implementation manners of the third aspect, in a tenth possible implementation manner, the first angle is N*45 degrees and N is a positive integer.

According to a fourth aspect, a signal transmission apparatus is provided, including: a receiving module, configured to receive a data packet sent by a transmit end, where the data packet carries modulated pilot information, and at least a part of pilot information carried in at least one symbol of the data packet is modulated by using a phase-shift keying PSK scheme with rotation of a first angle; and a detection module, configured to detect the modulated pilot information to determine that a format of the data packet is a data packet format corresponding to the PSK scheme with rotation of the first angle.

With reference to the fourth aspect, in a first possible implementation manner, the phase-shift keying scheme is a binary phase-shift keying BPSK scheme, and the detection module detects the modulated pilot information to determine that the format of the data packet is a data packet format corresponding to a BPSK scheme with rotation of the first angle.

With reference to the first possible implementation manner of the fourth aspect, in a second possible implementation manner, the at least one symbol is at least one signaling symbol in a signaling field of the data packet.

With reference to the second possible implementation manner of the fourth aspect, in a third possible implementation manner, all pilot information carried in one signaling symbol or two signaling symbols in the signaling field of the data packet is modulated by using the BPSK scheme with rotation of the first angle.

With reference to the second possible implementation manner of the fourth aspect, in a fourth possible implementation manner, all pilot information carried in all signaling symbols in the signaling field of the data packet is modulated by using the BPSK scheme with rotation of the first angle.

With reference to the second possible implementation manner of the fourth aspect, in a fifth possible implementation manner, a part of pilot information carried in each signaling symbol of the at least one signaling symbol is modulated by using the BPSK scheme with rotation of the first angle, and another part of the pilot information carried in each signaling symbol of the at least one signaling symbol is modulated by using a BPSK scheme with rotation of a second angle.

With reference to the second possible implementation manner of the fourth aspect, in a sixth possible implementation manner, pilot information carried in another signaling symbol except the at least one signaling symbol in the signaling field of the data packet is modulated by using a BPSK scheme with rotation of a second angle.

With reference to the sixth possible implementation manner of the fourth aspect, in a seventh possible implementation manner, pilot information carried in a first signaling symbol in the signaling field of the data packet is modulated by using a binary phase-shift keying BPSK scheme with rotation of 90 degrees, and pilot information carried in a second signaling symbol in the signaling field of the data packet is modulated by using a binary phase-shift keying BPSK scheme with rotation of 90 degrees, 45 degrees, or 0 degrees.

With reference to the second to seventh possible implementation manners of the fourth aspect, in an eighth possible implementation manner, the detection module detects a real part component and an imaginary part component of the pilot information and compares a result of the detection with a preset threshold to determine that the format of the data packet is the data packet format corresponding to the BPSK scheme with rotation of the first angle.

With reference to the eighth possible implementation manner of the fourth aspect, in a ninth possible implementation manner, the detection module performs, according to the following formula, an operation on a real part and an imaginary part of modulated pilot information of one of the at least one signaling symbol carried in the signaling field of the data packet, to obtain the result of the detection:

$$S = \sum_{j=1}^{J} (a_j^2 - b_j^2),$$

where $a_j$ is a real part component of modulated pilot information carried in the $j^{th}$ pilot subcarrier in the $i^{th}$ signaling symbol, $b_j$ is an imaginary part component of the modulated pilot information carried in the $j^{th}$ pilot subcarrier in the $i^{th}$ signaling symbol, j=1, 2, 3 . . . J, and J is a quantity of pilot subcarriers in each signaling symbol of the at least one signaling symbol; compares the result S of the detection with a first threshold; and if the result S of the detection is less than the first threshold, determines that the format of the data packet is the data packet format corresponding to the binary phase-shift keying scheme with rotation of the first angle.

With reference to the eighth possible implementation manner of the fourth aspect, in a tenth possible implementation manner, pilot information carried in the $j^{th}$ pilot subcarrier in the $i^{th}$ signaling symbol in the signaling field of the data packet is modulated by using a binary phase-shift keying BPSK scheme with a rotation angle of $\beta_{i,j}$, where i=1, 2, 3 ... I, j=1, 2, 3 ... J, I is a quantity of signaling symbols in the data packet, J is a quantity of pilot subcarriers in each signaling symbol of the at least one signaling symbol, and any one of the rotation angle $\beta_{i,j}$ is the first angle, where the detection module performs, according to the following formula, an operation on a real part and an imaginary part of the modulated pilot information carried in the signaling field of the data packet, to obtain the result of the detection:

$$S = \sum_{i=1}^{I} \sum_{j=1}^{J} (a_{ij}^2 - b_{ij}^2),$$

where $a_{ij}$ is a real part component of modulated pilot information carried in the $j^{th}$ pilot subcarrier in the $i^{th}$ signaling symbol, and $b_{ij}$ is an imaginary part component of the modulated pilot information carried in the $j^{th}$ pilot subcarrier in the $i^{th}$ signaling symbol; compares the result S of the detection with a first threshold; and if the result S of the detection is less than the first threshold, determines that the format of the data packet is the data packet format corresponding to the binary phase-shift keying scheme with rotation of the first angle.

With reference to any one of the second possible to tenth possible implementation manners of the fourth aspect, in an eleventh possible implementation manner, the receiving module further receives a second data packet, where a signaling field of the second data packet carries pilot information modulated by using the binary phase-shift keying BPSK scheme; and detects the pilot information modulated by using the binary phase-shift keying BPSK scheme, to determine that a format of the second data packet is a data packet format corresponding to the BPSK scheme.

With reference to any one of the foregoing possible implementation manners of the fourth aspect, in a twelfth possible implementation manner, the first angle is N*45 degrees and N is a positive integer.

In various embodiments, a transmit end can modulate, by using a PSK scheme with rotation of a preset angle, pilot information carried in a symbol of a data packet. A modulation scheme different from a conventional modulation scheme is used in the embodiments to modulate pilot information carried in a symbol of a data packet, so that a data packet format corresponding to the modulation scheme can be effectively detected at a receive end.

BRIEF DESCRIPTION OF THE DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

Figure 1:
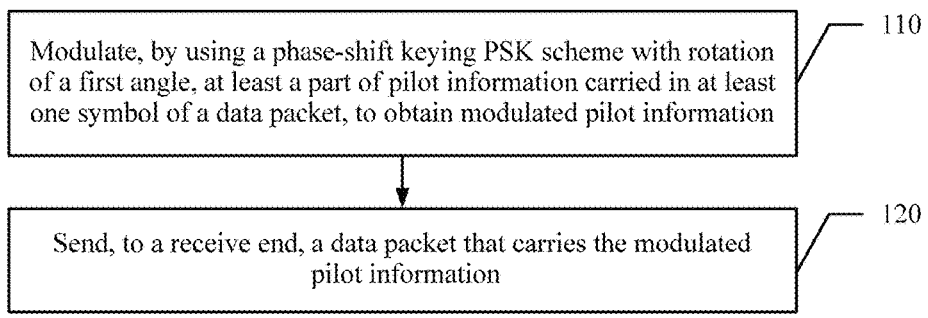
FIG. 1 is a schematic flowchart of a signal transmission method according to an embodiment.

The following clearly describes the technical solutions in the embodiments with reference to the accompanying drawings in the embodiments. Apparently, the described embodiments are some but not all of the embodiments. All other embodiments obtained by a person of ordinary skill in the art based on the embodiments without creative efforts shall fall within the protection scope.

It should be understood that, the disclosed embodiments may be applied to various communications systems, such as a Global System for Mobile communications (GSM) system, a Code Division Multiple Access (CDMA) system, a Wideband Code Division Multiple Access (WCDMA) system, a General Packet Radio Service (GPRS) system, a Long Term Evolution (LTE) system, an Advanced long term evolution (LTE-A) system, a Universal Mobile Telecommunications System (UMTS), and a Worldwide Interoperability for Microwave Access (WiMAX) system, which is not limited in the embodiments.

The embodiments may be used in radio access networks with different standards. A radio access network may include different network elements in different systems. For example, network elements on the radio access network in the LTE and LTE-A include an evolved NodeB (eNB), network elements on the radio access network in the WCDMA include an Radio Network Controller (RNC) and a NodeB, network elements on the WiMAX include a base station, and network elements on the WLAN/Wi-Fi include an access point (AP). No limitation is imposed by the embodiments. However, for ease of description, the following embodiments are described by using an access point in a Wi-Fi system as an example.

It should be further understood that in the embodiments, a transmit end or User Equipment (UE) includes but is not limited to a mobile station (MS), a mobile terminal, a mobile telephone, a handset, portable equipment, and the like. The transmit end may communicate with one or more core networks by using a radio access network (RAN). For example, the transmit end may be a mobile telephone (or referred to as a "cellular" telephone), or a computer having a wireless communication function; the transmit end may be a portable, pocket-sized, handheld, computer built-in, or in-vehicle mobile apparatus.

A Wi-Fi system using a HEW technology may use an unlicensed frequency band, and may coexist with an existing Wi-Fi system. Therefore, how to allow a HEW user to identify a data packet in a HEW format without affecting user performance of the existing Wi-Fi system is also a problem to be urgently resolved.

At a transmit end of a HEW system, a transmit module sequentially performs encoding, interleaving, constellation diagram mapping, inverse discrete Fourier transform, guard interval insertion, time window multiplication, and radio frequency processing on to-be-sent information (such as signaling information and pilot information) in a signaling field. In the embodiments, a constellation diagram mapping manner is mainly designed at the transmit end.

At a receive end of the HEW system, a receiving module can receive a symbol in a signaling field, detect a format of a data packet, and decode a parameter in the signaling field. In the embodiments, a method for detecting a data packet format is mainly designed at the receive end.

FIG. 1 is a schematic flowchart of a signal transmission method according to an embodiment. The method in FIG. 1 may be performed by a transmit end, for example, the transmit end may be an access point (AP) or a base station, or may be user equipment. The method in FIG. 1 includes the following content:

110. Modulate, by using a phase-shift keying PSK scheme with rotation of a first angle, at least a part of pilot information carried in at least one symbol of a data packet, to obtain modulated pilot information.

For example, the phase-shift keying PSK may be a binary phase-shift keying BPSK, and this embodiment is not limited thereto. For example, the phase-shift keying PSK may be phase-shift keying in another form, for example, quaternary phase-shift keying QPSK. A symbol of the data packet may be, for example, a symbol used for carrying signaling or a symbol used for carrying data, for example, an OFDM signaling symbol or an OFDM data symbol.

120. Send, to a receive end, a data packet that carries the modulated pilot information.

For example, the transmit end may send, to the receive end, the data packet that carries the modulated pilot information, so that the receive end determines, according to detection on the modulated pilot information, that a format of the data packet is a data packet format corresponding to the PSK scheme with rotation of the first angle.

According to this embodiment, a transmit end may modulate, by using a PSK scheme with rotation of a preset angle, pilot information carried in a symbol of the data packet. A modulation scheme different from a conventional modulation scheme is used in this embodiment to modulate pilot information carried in a symbol of a data packet, so that a data packet format corresponding to the modulation scheme can be effectively detected at a receive end.

According to this embodiment, in process 110, the transmit end may modulate, by using a binary phase-shift keying BPSK scheme with rotation of the first angle, at least a part of the pilot information carried in the at least one symbol of the data packet, to obtain the modulated pilot information.

According to this embodiment, in process 110, the transmit end may modulate, by using the binary phase-shift keying BPSK scheme with rotation of the first angle, at least a part of pilot information carried in at least one signaling symbol in a signaling field of the data packet, to obtain the modulated pilot information.

According to this embodiment, when pilot information carried in a signaling symbol in the signaling field of the data packet is being modulated, a modulation scheme that is used may be a BPSK scheme in which a phase is rotated by a preset angle. In other words, a BPSK modulation scheme with rotation of a preset angle is used in the pilot information carried in the signaling symbol of the data packet, or constellation diagram mapping with BPSK with a rotation of a preset angle is used in the pilot information carried in the signaling symbol of the data packet. The preset angle is not limited in this embodiment, provided that the preset angle is not equal to 0 degrees. For example, the preset angle may be ±30 degrees, ±45 degrees, ±60 degrees, ±90 degrees, ±120 degrees, ±135 degrees, or ±150 degrees. For another example, the preset angle may be an angle in any quadrant of a constellation diagram.

The foregoing signaling symbol may be a signaling symbol in a signaling field of a data packet, for example, a signaling symbol in a signaling field at the $20^{th}$ μs to the $24^{th}$ μs (including the $20^{th}$ μs and the $24^{th}$) in a PPDU frame of a data packet, and this embodiment is not limited thereto. For example, the foregoing signaling symbol may be a signaling symbol in a signaling field at the $24^{th}$ μs to the $28^{th}$ μs (including the $24^{th}$ μs and the $28^{th}$) in a PPDU frame of a data packet, or a signaling symbol in another signaling field of a PPDU frame of a data packet, or may be a data symbol in a data field of a PPDU frame.

The foregoing signaling field may include multiple signaling symbols, for example, each signaling symbol includes multiple subcarriers that are used to carry pilot information. In this embodiment, the pilot information carried in the subcarrier may be modulated by using the binary phase-shift keying BPSK scheme with rotation of the first angle.

Alternatively, the transmit end may modulate, by using a mixed modulation scheme, pilot information carried in subcarriers in multiple signaling symbols in the signaling field. For example, the transmit end may modulate all pilot information in one signaling symbol of multiple signaling symbols by using the binary phase-shift keying BPSK scheme with rotation of the first angle (for example, 90 degrees), where a binary phase-shift keying BPSK with rotation of 90 degrees is also referred to as QBPSK; and modulate all pilot information in another signaling symbol by using another modulation scheme, for example, perform modulation by using QBPSK, BPSK, QPSK, or perform modulation by using a binary phase-shift keying BPSK scheme with rotation of another angle (for example, 45 degrees); or the transmit end may modulate a part of pilot information in one signaling symbol of multiple signaling symbols by using the binary phase-shift keying BPSK scheme with rotation of the first angle, and modulate another part of the pilot information in this signaling symbol by using another modulation scheme. No limitation is imposed on this in this embodiment, provided that at least a part of pilot information carried in the signaling field is modulated by using the binary phase-shift keying BPSK scheme with rotation of the first angle.

It should be understood that the format of the data packet in this embodiment may refer to a frame format of a physical layer conformance procedure (PLCP) protocol data unit PPDU frame of a data packet in a Wi-Fi system. A modulation scheme of the signaling field plays a crucial role in differentiating between frame formats of data packets. For example, a BPSK modulation scheme is used in signaling information in a signaling field of a data packet with legacy format, a QBPSK modulation scheme is used in signaling information in a signaling field of a data packet in a high throughput format, the BPSK modulation scheme and the QBPSK modulation scheme are used in signaling information in a signaling field of a data packet in a very high throughput format, and the BPSK modulation scheme is used in all pilot information in signaling fields of data packets in these formats. However, the binary phase-shift keying BPSK scheme with rotation of the first angle may be used in pilot information in the signaling field of the data packet in this embodiment. The BPSK scheme with rotation of the first angle may correspond to a corresponding data packet format, so that the receive end can detect the data packet format corresponding to the BPSK scheme with rotation of the first angle. In a case in which the pilot information in the signaling field is modulated by using the binary phase-shift keying BPSK scheme with rotation of the first angle, the corresponding data packet format may be a frame format different from the legacy format, the high throughput format, and the very high throughput format, for example, a HEW format.

According to this embodiment, in 110, the transmit end may modulate, by using a binary phase-shift keying BPSK scheme with a rotation angle of $\beta_{i,j}$, pilot information carried in the $j^{th}$ pilot subcarrier in the $i^{th}$ signaling symbol in the signaling field of the data packet, where i=1, 2, 3 . . . I, j=1, 2, 3 . . . J, I is a quantity of signaling symbols in the data packet, J is a quantity of pilot subcarriers in each signaling symbol of the at least one signaling symbol, and at least one of the rotation angle $\beta_{i,j}$ is the first angle.

For example, in a Wi-Fi system, a data packet includes two signaling symbols. It is assumed that each signaling symbol (for example, an OFDM symbol) includes m pilot subcarriers, and rotation angles of m pilot subcarriers used by a first signaling symbol are respectively α1, α2, α3, α4, . . . , and αm, that is, α1 indicates that the first pilot subcarrier in the first signaling symbol is modulated by using BPSK with a rotation angle of α1; α2 indicates that the second pilot subcarrier in the first signaling symbol is modulated by using BPSK with a rotation angle of α2; α3 indicates that the third pilot subcarrier in the first signaling symbol is modulated by using BPSK with a rotation angle of α3; α4 indicates that the fourth pilot subcarrier in the first signaling symbol is modulated by using BPSK with a rotation angle of α4; where αm indicates that the $m^{th}$ pilot subcarrier in the first signaling symbol is modulated by using BPSK with a rotation angle of αm. Rotation angles of m pilot subcarriers used by a second signaling symbol are respectively β1, β2, β3, β4, . . . , and βm, that is, β1 indicates that the first pilot subcarrier in the second signaling symbol is modulated by using BPSK with a rotation angle of β1; β2 indicates that the second pilot subcarrier in the second signaling symbol is modulated by using BPSK with a rotation angle of β2; β3 indicates that the third pilot subcarrier in the second signaling symbol is modulated by using BPSK with a rotation angle of β3; β4 indicates that the fourth pilot subcarrier in the second signaling symbol is modulated by using BPSK with a rotation angle of β4; where βm indicates that the $m^{th}$ pilot subcarrier in the second signaling symbol is modulated by using BPSK with a rotation angle of βm. α1, α2, α3, α4, . . . , and αm and β1, β2, β3, β4, . . . , and βm may be combinations of any angles, provided that they are not all zeros.

According to this embodiment, in 110, the transmit end may modulate, by using the BPSK scheme with rotation of the first angle, all pilot information carried in one signaling symbol or two signaling symbols in the signaling field of the data packet.

For example, a BPSK modulation scheme with rotation of 90 degrees is used for a part or all of pilot subcarriers in a first signaling symbol and/or a second signaling symbol of a data packet in a HEW format. For another example, when a data packet in a HEW format includes two signaling symbols, a BPSK modulation scheme with rotation of 90 degrees is used for a pilot subcarrier in a first signaling symbol, and the BPSK modulation scheme with rotation of 90 degrees is also used for a pilot subcarrier in a second signaling symbol. In other words, constellation diagram mapping (a mapped constellation diagram) with BPSK with rotation of 90 degrees is used in pilot information in the first signaling symbol of the data packet in HEW format, and the constellation diagram mapping (the mapped constellation diagram) with the BPSK with rotation of 90 degrees is used in the pilot information in the second signaling symbol. For another example, a BPSK modulation scheme with rotation of 90 degrees is used for a pilot subcarrier in a first signaling symbol of a data packet in a HEW format, and a BPSK modulation scheme or a BPSK modulation scheme with rotation of 45 degrees is used for a pilot subcarrier in a second signaling symbol.

According to this embodiment, in 110, the transmit end may modulate, by using the BPSK scheme with rotation of the first angle, all pilot information carried in all signaling symbols in the signaling field of the data packet.

According to this embodiment, the first angle is N*45 degrees and N is a positive integer. For example, the first angle may be 45 degrees, 90 degrees, 135 degrees, 180 degrees, 225 degrees, or 315 degrees.

Optionally, in another embodiment, the method in FIG. 1 further includes: the transmit end may modulate, by using a binary phase-shift keying BPSK scheme with rotation of a third angle, at least a part of signaling information carried in the at least one signaling symbol in the signaling field of the data packet, to obtain modulated signaling information, where in 120, the transmit end may send, to the receive end, a data packet that carries the modulated pilot information and the modulated signaling information. The third angle may be N*45 degrees and N is a positive integer. For example, the third angle may be 45 degrees, 90 degrees, 135 degrees, 180 degrees, 225 degrees, or 315 degrees.

According to a difference in modulation schemes for a data subcarrier in a signaling field, the following combinations of a modulation scheme for a data subcarrier and a modulation scheme for a pilot subcarrier may be used: (1) QBPSK modulation is used for all pilot subcarriers in all symbols; (2) no limitation is imposed on a modulation scheme for a data subcarrier in a symbol; and QBPSK modulation is used for all pilot subcarriers in two signaling symbols; (3) a QBPSK modulation scheme is used for a pilot subcarrier, and a BPSK modulation scheme is used for a data subcarrier; (4) a QBPSK modulation scheme is used for a pilot subcarrier, and a QBPSK modulation scheme is used for a data subcarrier; (5) a QBPSK modulation scheme is used for a pilot subcarrier, and a combination of a BPSK modulation scheme and a QBPSK modulation scheme is used for a data subcarrier; (6) a QBPSK modulation scheme is used for a pilot subcarrier, and a combination of a QBPSK modulation scheme and a BPSK modulation scheme is used for a data subcarrier; (7) a QBPSK modulation scheme is used for a pilot subcarrier, and a BPSK modulation scheme with rotation of 45 degrees is used for a data subcarrier.

Alternatively, the transmit end may modulate, by using a BPSK scheme, at least a part of signaling information carried in the at least one signaling symbol in the signaling field of the data packet.

According to this embodiment, the format of the data packet is a high efficiency wireless local area network HEW format, the signaling field is a signaling field in a physical layer conformance procedure (PLCP) protocol data unit PPDU frame of the data packet, the at least one signaling symbol is at least one of HEW SIG A1 and HEW SIG A2, and the HEW SIG A1 and the HEW SIG A2 are respectively a first signaling symbol and a second signaling symbol that follow an L-SIG symbol in the PPDU frame.

For example, in a HEW system, two signaling symbols are set to follow an L-SIG symbol in a legacy signaling field of a PPDU frame of a data packet: HEW SIG A1 and HEW SIG A2. The transmit end may modulate, by using a BPSK scheme with rotation of a preset angle, pilot information carried in at least one of the HEW SIG A1 and the HEW SIG A2.

According to this embodiment, the signaling field is a signaling field in an advanced wireless system AWS, and the at least one signaling symbol is at least one of AWS-SIG1 and AWS-SIG2.

Figure 2:
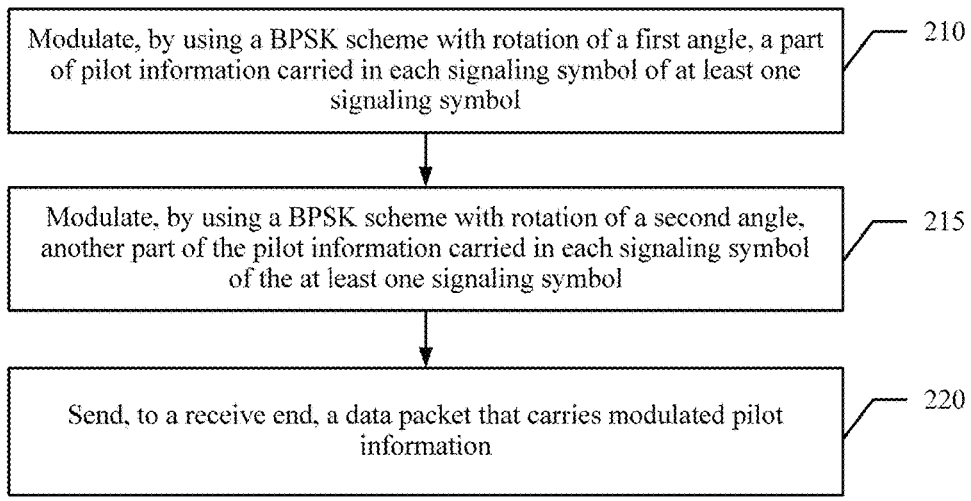
FIG. 2 is a schematic flowchart of a signal transmission method according to another embodiment.

FIG. 2 is a schematic flowchart of a signal transmission method according to another embodiment. The method in FIG. 2 may be performed by a transmit end, for example, the transmit end may be an access point or a base station, or may be user equipment. The method in FIG. 2 is an example of the method in FIG. 1, and detailed description is appropriately omitted herein. The method in FIG. 2 includes the following content:

210. Modulate, by using a BPSK scheme with rotation of a first angle, a part of pilot information carried in each signaling symbol of at least one signaling symbol.

215. Modulate, by using a BPSK scheme with rotation of a second angle, another part of the pilot information carried in each signaling symbol of the at least one signaling symbol.

220. Send, to a receive end, a data packet that carries modulated pilot information.

For example, in a Wi-Fi system, a data packet may include two signaling symbols, and each signaling symbol may include four pilot subcarriers: for example, a first pilot subcarrier and a second pilot subcarrier that are located on a side of a center frequency, and a third pilot subcarrier and a fourth pilot subcarrier that are located on the other side of the center frequency. The transmit end may modulate, by using the BPSK scheme with rotation of the first angle, pilot information carried in the first pilot subcarrier and the second pilot subcarrier, and modulate, by using the BPSK scheme with rotation of the second angle, pilot information carried in the third pilot subcarrier and the fourth pilot subcarrier. Alternatively, the transmit end may modulate, by using the BPSK scheme with rotation of the first angle, pilot information carried in the first pilot subcarrier and the third pilot subcarrier, and modulate, by using the BPSK scheme with rotation of the second angle, pilot information carried in the second pilot subcarrier and the fourth pilot subcarrier, and the like.

According to this embodiment, the transmit end may modulate, by using a BPSK scheme with rotation of a preset angle, pilot information carried in a signaling symbol in a signaling field of the data packet. A modulation scheme different from a conventional modulation scheme is used in this embodiment to modulate pilot information carried in a signaling symbol in a signaling field of a data packet, so that a data packet format corresponding to the modulation scheme can be effectively detected at a receive end.

According to this embodiment, the second angle is M*45 degrees, where M is an integer. For example, the second angle may be 0 degrees, 45 degrees, 90 degrees, 135 degrees, 180 degrees, or 225 degrees.

Figure 3:
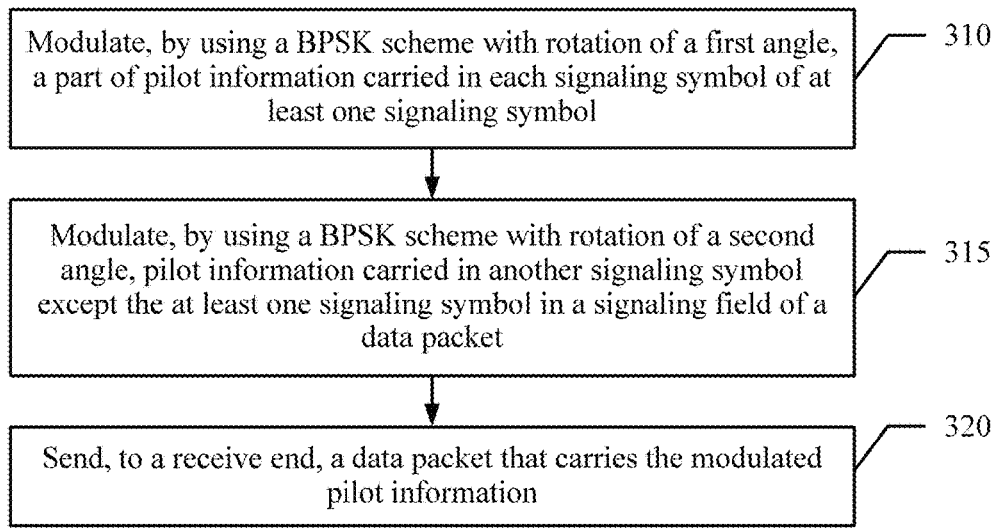
FIG. 3 is a schematic flowchart of a signal transmission method according to still another embodiment.

FIG. 3 is a schematic flowchart of a signal transmission method according to still another embodiment. The method in FIG. 3 may be performed by a transmit end, for example, the transmit end may be a base station or an AP, or may be user equipment. The method in FIG. 3 is an example of the method in FIG. 1, and detailed description is appropriately omitted herein. The method in FIG. 3 includes the following content:

310. Modulate, by using a BPSK scheme with rotation of a first angle, a part of pilot information carried in each signaling symbol of at least one signaling symbol.

315. Modulate, by using a BPSK scheme with rotation of a second angle, pilot information carried in another signaling symbol except the at least one signaling symbol in a signaling field of a data packet.

320. Send, to a receive end, a data packet that carries modulated pilot information.

For example, in an LTE system, a data packet may include two signaling symbols. The transmit end may modulate, by using the BPSK scheme with rotation of the first angle, pilot information carried in a pilot subcarrier in a first signaling symbol, and modulate, by using the BPSK scheme with rotation of the second angle, pilot information carried in a pilot subcarrier in a second signaling symbol.

According to this embodiment, the transmit end may modulate, by using a BPSK scheme with rotation of a preset angle, pilot information carried in a signaling symbol in a signaling field of the data packet. A modulation scheme different from a conventional modulation scheme is used in this embodiment to modulate pilot information carried in a signaling symbol in a signaling field of a data packet, so that a data packet format corresponding to the modulation scheme can be effectively detected at a receive end.

According to this embodiment, the second angle is M*45 degrees, where M is an integer. For example, the second angle may be 0 degrees, 45 degrees, 90 degrees, 135 degrees, 180 degrees, or 225 degrees.

According to this embodiment, in 310, the transmit end may modulate, by using a binary phase-shift keying BPSK scheme with rotation of 90 degrees, pilot information carried in a first signaling symbol, and modulate, by using the binary phase-shift keying BPSK scheme with rotation of 90 degrees, pilot information carried in a second signaling symbol.

According to this embodiment, in 310, the transmit end may modulate, by using the binary phase-shift keying BPSK scheme with rotation of 90 degrees, the pilot information carried in the first signaling symbol, and modulate, by using a binary phase-shift keying BPSK scheme with rotation of 45 degrees, the pilot information carried in the second signaling symbol, or modulate, by using a binary phase-shift keying BPSK scheme (that is, a BPSK scheme with rotation of 0 degrees), the pilot information carried in the second signaling symbol.

Figure 4:
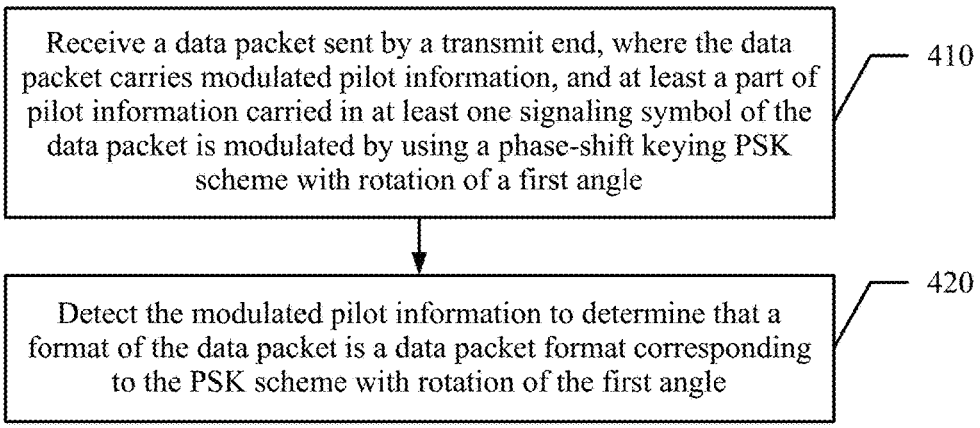
FIG. 4 is a schematic flowchart of a signal transmission method according to yet another embodiment.

FIG. 4 is a schematic flowchart of a signal transmission method according to yet another embodiment. The method in FIG. 4 may be performed by a receive end, for example, a receive end may be user equipment or may be a base station. The embodiment of FIG. 4 corresponds to the embodiments of FIG. 2 and FIG. 3, and detailed description is appropriately omitted herein. The method in FIG. 4 includes the following content:

410. Receive a data packet sent by a transmit end, where the data packet carries modulated pilot information, and at least a part of pilot information carried in at least one signaling symbol of the data packet is modulated by using a phase-shift keying PSK scheme with rotation of a first angle.

420. Detect the modulated pilot information to determine that a format of the data packet is a data packet format corresponding to the PSK scheme with rotation of the first angle.

According to this embodiment, a transmit end may modulate, by using a PSK scheme with rotation of a preset angle, pilot information carried in a symbol of a data packet. A modulation scheme different from a conventional modulation scheme is used in this embodiment to modulate pilot information carried in a symbol of a data packet, so that a data packet format corresponding to the modulation scheme can be effectively detected at a receive end.

According to this embodiment, the phase-shift keying scheme is a binary phase-shift keying BPSK scheme. In 420, the receive end may detect the modulated pilot information to determine that the format of the data packet is the data packet format corresponding to a BPSK scheme with rotation of the first angle.

According to this embodiment, at least one symbol is at least one signaling symbol in a signaling field of the data packet.

For example, in a conventional technology, pilot information carried in a signaling field is generally modulated by using a BPSK scheme. However, in this embodiment, pilot information carried in the signaling field is modulated by using the BPSK scheme with rotation of the preset angle. It can be determined, by detecting a metric value of the pilot information modulated by using the BPSK scheme with rotation of the preset angle, and comparing the metric value with a preset threshold, that the format of the data packet is a data packet format corresponding to the BPSK scheme with rotation of the first angle instead of a data packet format corresponding to the BPSK scheme. The foregoing threshold may be set according to the metric value of the pilot information modulated by using the BPSK scheme with rotation of the preset angle and a metric value of pilot information modulated by using the BPSK scheme, and the format of the data packet is determined by comparing the foregoing metric value with the preset threshold. The foregoing metric value may be a measured value of the pilot information, or may be an operation result obtained after an operation is performed on a measured value, which is not limited in this embodiment, provided that the pilot information modulated by using the BPSK scheme with rotation of the preset angle and the pilot information modulated by using the BPSK scheme can be distinguished.

According to this embodiment, in 420, the receive end may detect a real part component and an imaginary part component of the pilot information and compare a result of the detection with the preset threshold to determine that the format of the data packet is the data packet format corresponding to the BPSK scheme with rotation of the first angle.

For example, an operation value (a square difference or a quadratic sum or a product of a real part component and an imaginary part component) of the real part component and the imaginary part component of the pilot information modulated by using the BPSK scheme and an operation value of a real part component and an imaginary part component of the pilot information modulated by using the BPSK scheme with rotation of the preset angle may be located in different threshold ranges. Therefore, the operation value of the pilot information may be compared with the preset threshold to determine whether the format of the data packet is the data packet format corresponding to the BPSK scheme or is the data packet format corresponding to the BPSK scheme with rotation of the preset angle. The foregoing threshold may be set according to a metric value of the real part component and the imaginary part component of the pilot information modulated by using the BPSK scheme with rotation of the preset angle and a metric value of the real part component and the imaginary part component of the pilot information modulated by using the BPSK scheme.

According to this embodiment, in 420, the receive end may perform, according to the following formula, an operation on a real part and an imaginary part of modulated pilot information of one of the at least one signaling symbol carried in the signaling field of the data packet, to obtain the result of the detection:

$$S = \sum_{j=1}^{J} (a_j^2 - b_j^2),$$

where $a_j$ a real part component of modulated pilot information carried in the $j^{th}$ pilot subcarrier in the $i^{th}$ signaling symbol, $b_j$ is an imaginary part component of the modulated pilot information carried in the $j^{th}$ pilot subcarrier in the $i^{th}$ signaling symbol, j=1, 2, 3 . . . J, and J is a quantity of pilot subcarriers in each signaling symbol of the at least one signaling symbol; compare the result S of the detection with a first threshold; and if the result S of the detection is less than the first threshold, determine that the format of the data packet is the data packet format corresponding to the binary phase-shift keying scheme with rotation of the first angle.

According to this embodiment, the pilot information carried in the $j^{th}$ pilot subcarrier in the $i^{th}$ signaling symbol in the signaling field of the data packet is modulated by using a binary phase-shift keying BPSK scheme with a rotation angle of $\beta_{i,j}$, where i=1, 2, 3 . . . I, j=1, 2, 3 . . . J, I is a quantity of signaling symbols in the data packet, J is the quantity of pilot subcarriers in each signaling symbol of the at least one signaling symbol, and at least one of the rotation angle $\beta_{i,j}$ is the first angle. In 420, the receive end may perform, according to the following formula, an operation on a real part and an imaginary part of the modulated pilot information carried in the signaling field of the data packet, to obtain the result of the detection:

$$S = \sum_{i=1}^{I} \sum_{j=1}^{J} (a_{ij}^2 - b_{ij}^2),$$

where $a_{ij}$ is a real part component of modulated pilot information carried in the $j^{th}$ pilot subcarrier in the $i^{th}$ signaling symbol, and $b_{ij}$ is an imaginary part component of the modulated pilot information carried in the $j^{th}$ pilot subcarrier in the $i^{th}$ signaling symbol; compare the result S of the detection with a first threshold; and if the result S of the detection is less than the first threshold, determine that the format of the data packet is the data packet format corresponding to the binary phase-shift keying scheme with rotation of the first angle.

According to this embodiment, all pilot information carried in one signaling symbol or two signaling symbols in the signaling field of the data packet is modulated by using the BPSK scheme with rotation of the first angle.

According to this embodiment, all pilot information carried in all signaling symbols in the signaling field of the data packet is modulated by using the BPSK scheme with rotation of the first angle.

According to this embodiment, a part of pilot information carried in each signaling symbol of the at least one signaling symbol is modulated by using the BPSK scheme with rotation of the first angle, and another part of the pilot information carried in each signaling symbol of the at least one signaling symbol is modulated by using a BPSK scheme with rotation of a second angle.

According to this embodiment, pilot information carried in another signaling symbol except the at least one signaling symbol in the signaling field of the data packet is modulated by using a BPSK scheme with rotation of a second angle.

According to this embodiment, pilot information carried in a first signaling symbol in the signaling field of the data packet is modulated by using a binary phase-shift keying BPSK scheme with rotation of 90 degrees, and pilot information carried in a second signaling symbol in the signaling field of the data packet is modulated by using the binary phase-shift keying BPSK scheme with rotation of 90 degrees.

According to this embodiment, pilot information carried in a first signaling symbol in the signaling field of the data packet is modulated by using a binary phase-shift keying BPSK scheme with rotation of 90 degrees, and pilot information carried in a second signaling symbol in the signaling field of the data packet is modulated by using a binary phase-shift keying BPSK scheme with rotation of 45 degrees or 0 degrees.

According to this embodiment, the first angle is N*45 degrees and N is a positive integer.

According to this embodiment, the format of the data packet is a high efficiency wireless local area network HEW format, the signaling field is a signaling field in a physical layer conformance procedure (PLCP) protocol data unit PPDU frame of the data packet, the at least one signaling symbol is at least one of HEW SIG A1 and HEW SIG A2, and the HEW SIG A1 and the HEW SIG A2 are respectively a first signaling symbol and a second signaling symbol that follow an L-SIG symbol in the PPDU frame.

According to this embodiment, the signaling field is a signaling field in an advanced wireless system AWS, and the at least one signaling symbol is at least one of AWS-SIG1 and AWS-SIG2.

Optionally, in another embodiment, the method further includes: receiving a second data packet, where a signaling field of the second data packet carries pilot information modulated by using the binary phase-shift keying BPSK scheme; and detecting the pilot information modulated by using the binary phase-shift keying BPSK scheme, to determine that a format of the second data packet is a data packet format corresponding to the BPSK scheme.

Figure 5:
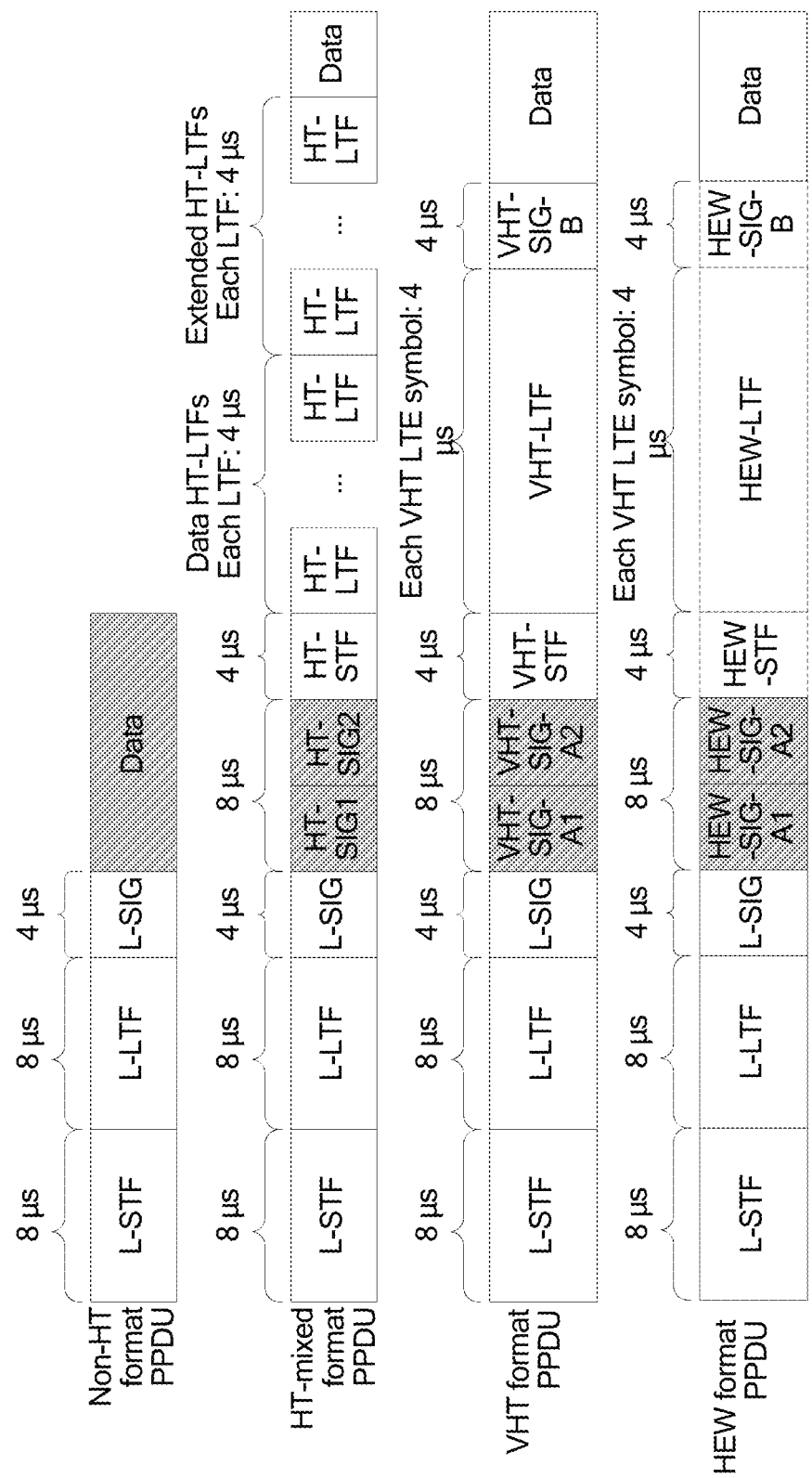
FIG. 5 is a schematic diagram of a frame format of a data packet according to an embodiment.

FIG. 5 is a schematic diagram of a frame format of a data packet according to an embodiment.

Referring to FIG. 5, a frame format of a PPDU of a data packet may be a legacy format, an HT-mixed format, a VHT format, and a HEW format, where a 8-µs L-STF, a 8-µs L-LTF, and a 4-µs L-SIG are set sequentially at the $0^{th}$ µs to the $20^{th}$ µs (including the $0^{th}$ µs and the $20^{th}$) of PPDUs in the foregoing formats. Data is set at the $20^{th}$ µs to the $28^{th}$ µs (including the $20^{th}$ µs and the $28^{th}$) of a PPDU in a non-HT format, signaling symbols HT-SIG1 and HT-SIG2 are set in a signaling field at the $20^{th}$ µs to the $28^{th}$ µs (including the $20^{th}$ µs and the $28^{th}$) of a PPDU in an HT-mixed format, signaling symbols VHT-SIG A1 and VHT-SIG A2 are set in a signaling field at the $20^{th}$ µs to the $28^{th}$ (including the $20^{th}$ µs and the $28^{th}$) µs of a PPDU in a VHT-mixed format, and signaling symbols HEW-SIG A1 and HEW-SIG A2 are set in a signaling field at the $20^{th}$ µs to the $28^{th}$ µs (including the $20^{th}$ µs and the $28^{th}$) of a PPDU in a HEW format.

Data packets in different Wi-Fi systems may have different frame formats, and a frame format of a data packet may correspond to a modulation format of signaling information carried in a signaling symbol in a signaling field of the data packet. For example, (a data subcarrier of) signaling information carried in HT-SIG1 and HT-SIG2 is modulated by using a QBPSK scheme, (a data subcarrier of) signaling information carried in VHT-SIG-A1 is modulated by using a BPSK scheme, and (a data subcarrier of) signaling information carried in VHT-SIG-A2 is modulated by using the QBPSK scheme. Data at the $20^{th}$ µs to the $28^{th}$ µs (including the $20^{th}$ µs and the $28^{th}$) of a PPDU with legacy format is modulated by a scheme such as the BPSK or the QPSK. In addition, pilot information carried in signaling symbols in signaling fields of data packets in the foregoing formats is modulated by using the BPSK scheme.

TABLE 1

Modulation scheme at the $20^{th}$ µs to the $28^{th}$ µs (including the $20^{th}$ µs and the $28^{th}$) of a data packet

| | $20^{th}$ µs to $24^{th}$ µs | | $24^{th}$ µs to $28^{th}$ µs | |
| --- | --- | --- | --- | --- |
| | Data subcarrier | Pilot subcarrier | Data subcarrier | Pilot subcarrier |
| Legacy format | BPSK or another | BPSK | BPSK or another | BPSK |
| High rate format | QBPSK | BPSK | QBPSK | BPSK |
| Very high rate format | BPSK | BPSK | QBPSK | BPSK |

Pilot information carried in the HEW-SIG A1 and/or the HEW-SIG A2 may be modulated by using a BPSK scheme with rotation of a preset angle. Signaling information carried in the HEW-SIG A1 and/or the HEW-SIG A2 may be modulated by using the BPSK scheme with rotation of the preset angle, which is not limited in this embodiment, for example, the signaling information carried in the HEW-SIG A1 and/or the HEW-SIG A2 may be modulated by using the BPSK scheme.

Figure 6:
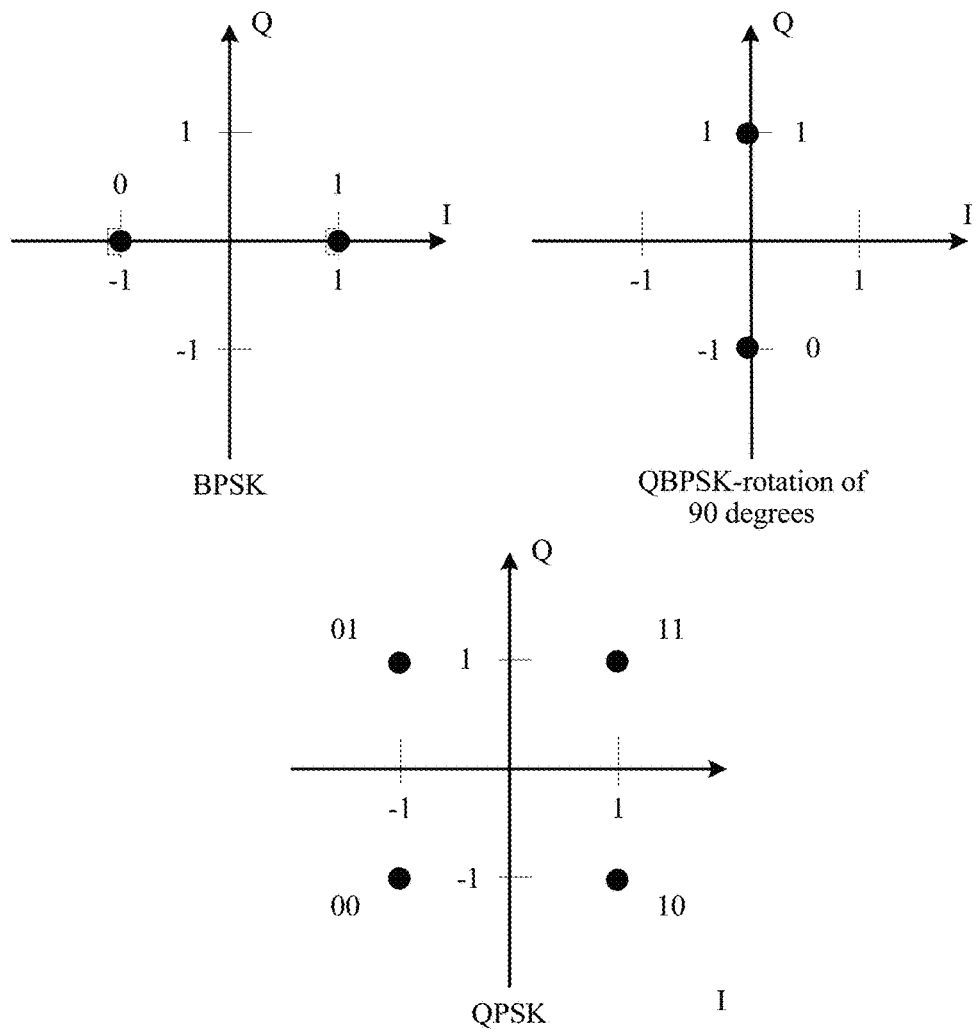
FIG. 6 is a schematic diagram of constellation diagrams of three conventional modulation schemes.

FIG. 6 is a schematic diagram of constellation diagrams of three conventional modulation schemes.

Referring to FIG. 6, for BPSK, an information element 0 is mapped to a point (−1, 0) on a real axis (I axis) and an information element 1 is mapped to a point (+1, 0) on the real axis. For QBPSK (BPSK with rotation of 90 degrees), an information element 0 is mapped to a point (0, −1) on an imaginary axis (Q axis) and an information element 1 is mapped to a point (0, +1) on the imaginary axis. For QPSK, an information element 11 is mapped to a point (+1, +1) in a first quadrant, an information element 01 is mapped to a point (−1, +1) in a second quadrant, an information element 00 is mapped to a point (−1, −1) in a third quadrant, and an information element 10 is mapped to a point (+1, −1) in a fourth quadrant.

Figure 7:
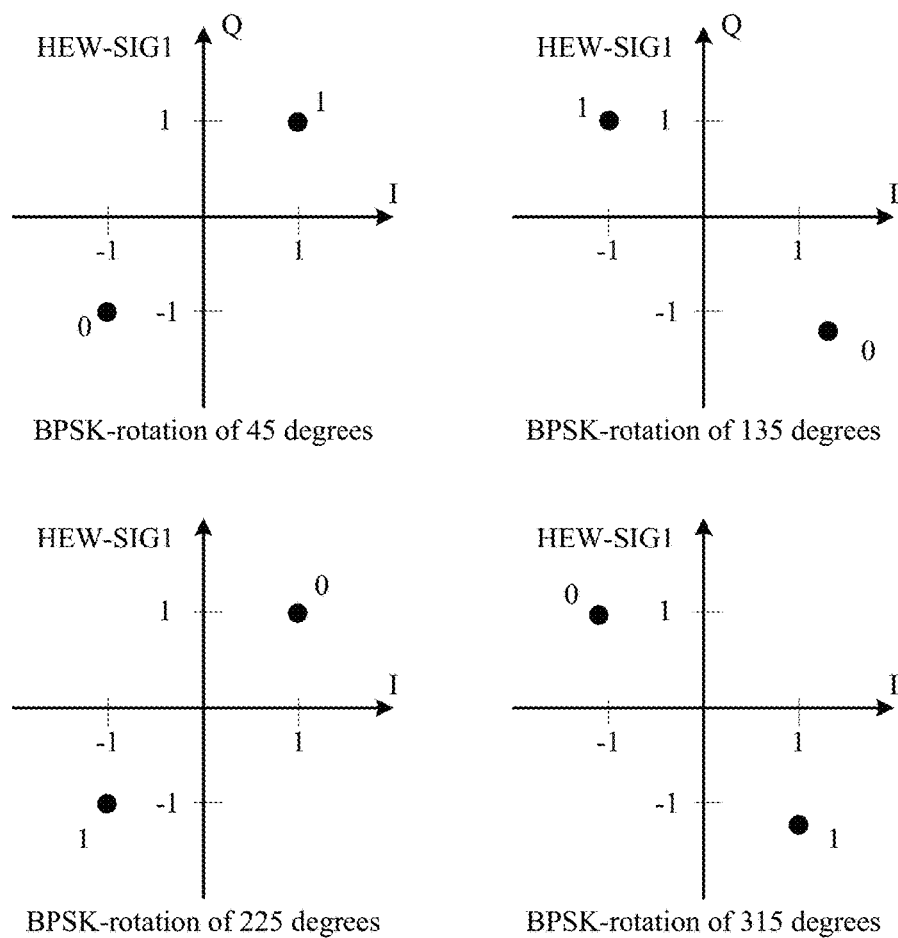
FIG. 7 is a schematic diagram of constellation diagrams of four modulation schemes according to an embodiment.

FIG. 7 is a schematic diagram of constellation diagrams of four modulation schemes according to an embodiment.

Referring to FIG. 7, for a BPSK scheme with rotation of 45 degrees, an information element 0 is mapped to a point (−1, −1) in a third quadrant, and an information element 1 is mapped to a point (+1, +1) in a first quadrant, that is, a phase is rotated by 45 degrees when compared with that of BPSK. For a BPSK scheme with rotation of 135 degrees, an information element 0 is mapped to a point (1, −1) in a fourth quadrant, and an information element 1 is mapped to a point (−1, +1) in a second quadrant, that is, a phase is rotated by 135 degrees when compared with that of BPSK. For a BPSK scheme with rotation of 225 degrees, an information element 0 is mapped to a point (+1, +1) in a first quadrant, and an information element 1 is mapped to a point (−1, −1) in a third quadrant, that is, a phase is rotated by 225 degrees when compared with that of BPSK. For a BPSK scheme with rotation of 315 degrees, an information element 0 is mapped to a point (−1, +1) in a second quadrant, and an information element 1 is mapped to a point (+1, −1) in a fourth quadrant, that is, a phase is rotated by 315 degrees when compared with that of BPSK.

Figure 8:
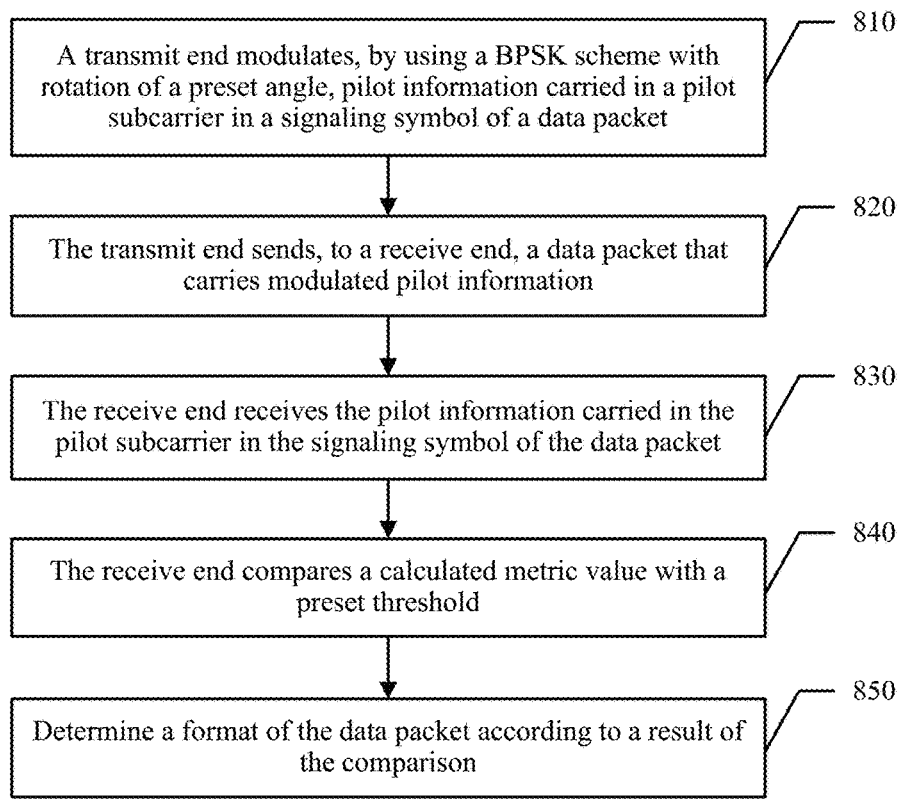
FIG. 8 is a schematic flowchart of a signal transmission process according to an embodiment.
Figure 9:
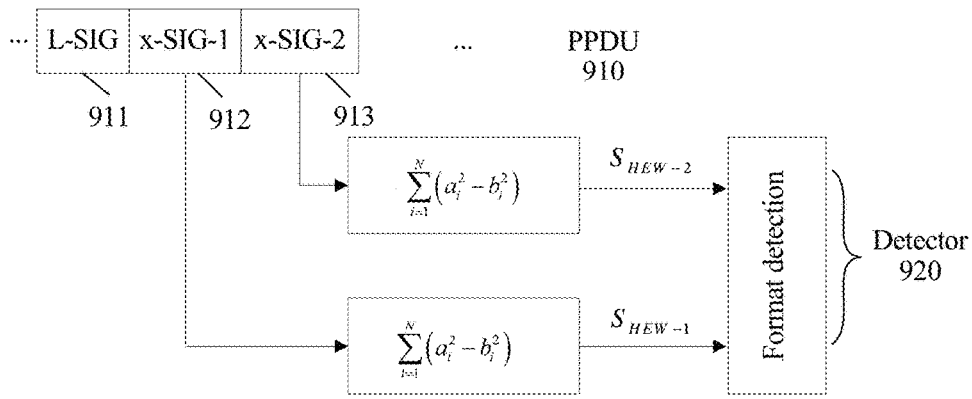
FIG. 9 is a schematic diagram of performing format detection on a data packet using a detector according to an embodiment.
Figure 10:
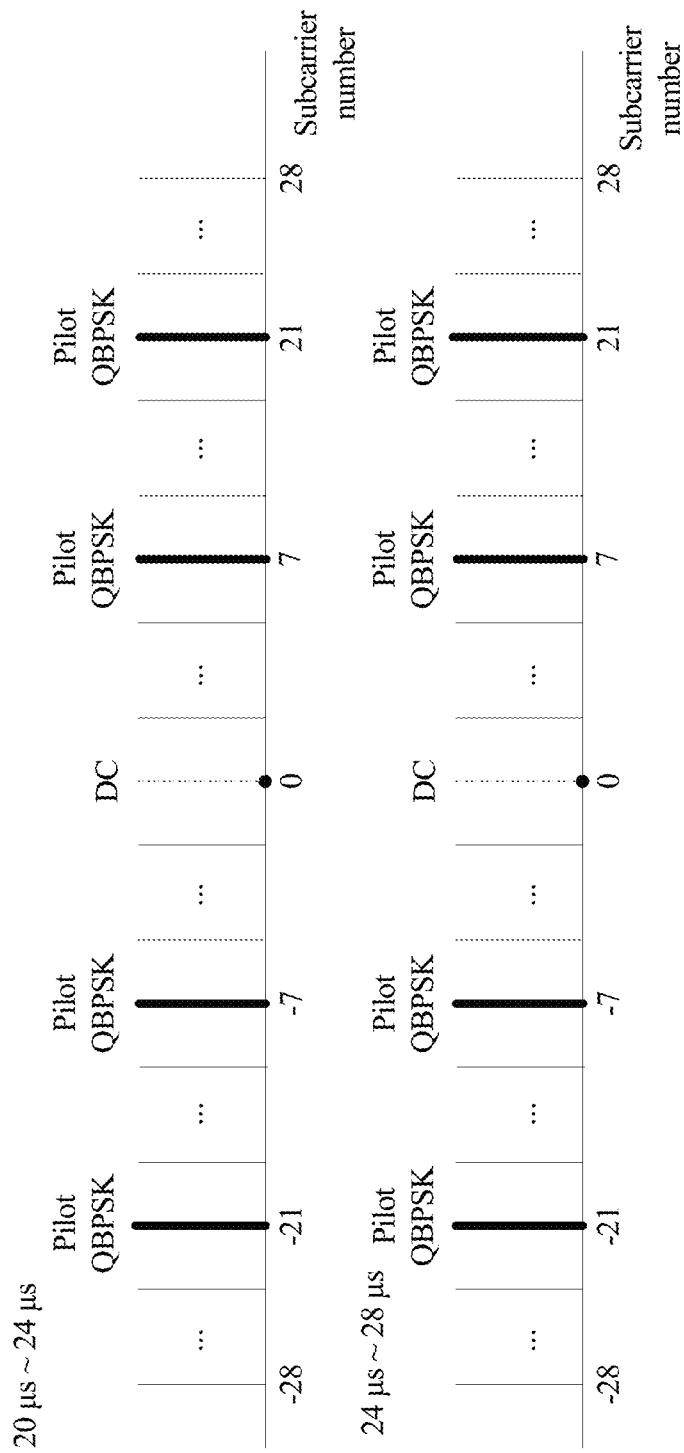
FIG. 10 is a schematic diagram of distribution of pilot subcarriers according to an embodiment.

FIG. 8 is a schematic flowchart of a signal transmission process according to an embodiment. FIG. 9 is a schematic diagram of performing format detection on a data packet using a detector according to an embodiment. FIG. 10 is a schematic diagram of distribution of pilot subcarriers according to an embodiment.

In this embodiment, when a format of the data packet is a HEW format, on a transmit end, pilot information in x-SIG-1 and x-SIG-2 may be modulated by using a BPSK scheme with rotation of 90 degrees.

Referring to FIG. 9, a detector 920 may detect, by using a detection algorithm, a metric value or a measurement indicator of pilot information carried in signaling fields x-SIG-1 912 to x-SIG-2 913 (for example, signaling fields at the $20^{th}$ μs to the $28^{th}$ μs (including the $20^{th}$ μs and the $28^{th}$) of a data packet), and determine, according to the metric value or the measurement indicator, whether the data packet is in a HEW format.

The following describes, with reference to FIG. 8, how to determine a format of a data packet by detecting pilot information at a time position at the $20^{th}$ μs to the $24^{th}$ μs (including the $20^{th}$ μs and the $24^{th}$) (x-SIG-1) and pilot information at a time position at the $24^{th}$ μs to the $28^{th}$ μs (including the $24^{th}$ μs and the $28^{th}$) (x-SIG-2) in a PPDU frame of the data packet.

810. A transmit end modulates, by using a BPSK scheme with rotation of a preset angle, pilot information carried in a pilot subcarrier in a signaling symbol of a data packet.

In a Wi-Fi system, a signaling symbol at the $20^{th}$ μs to the $28^{th}$ μs (including the $20^{th}$ μs and the $28^{th}$) in a PPDU frame of a data packet is HEW-SIG A1 and/or HEW-SIG A2. For example, the transmit end may modulate, by using a BPSK scheme with rotation of 90 degrees, pilot information carried in a pilot subcarrier in a signaling symbol in a signaling field at the $20^{th}$ μs to the $28^{th}$ μs (including the $20^{th}$ μs and the $28^{th}$) in a PPDU frame of a data packet. Specifically, the transmit end may modulate, by using the BPSK scheme with rotation of 90 degrees, pilot information carried in a first signaling symbol at the $20^{th}$ μs to the $24^{th}$ μs (including the $20^{th}$ μs and the $24^{th}$), and/or modulate, by using the BPSK scheme with rotation of 90 degrees, pilot information carried in a second signaling symbol at the $24^{th}$ μs to the $28^{th}$ μs (including the $24^{th}$ μs and the $28^{th}$).

820. The transmit end sends, to a receive end, a data packet that carries modulated pilot information.

830. The receive end receives the pilot information carried in the pilot subcarrier in the signaling symbol of the data packet.

The receive end calculates a first metric value of a first signaling symbol and a second metric value of a second signaling symbol.

For example, the receive end calculates a first metric value of pilot information carried in a first signaling symbol in a PPDU frame of the data packet and/or a second metric value of pilot information carried in a second signaling symbol in the PPDU frame of the data packet.

For each signaling symbol, the following measurement method may be used. The measurement method in this embodiment is: first calculating a difference between real part energy (that is, a square of a real part) and imaginary part energy (that is, a square of an imaginary part) that are of pilot information in subcarriers in this signaling symbol, and adding differences obtained for all the subcarriers, to obtain the following operation result:

$$S = \sum_{i=1}^{N} (a_i^2 - b_i^2),$$

where

N is a quantity of pilot subcarriers that carry pilot information in each signaling symbol, $a_i$ is a real part of pilot information in a subcarrier i, and $b_i$ is an imaginary part of the pilot information in the subcarrier i.

Referring to FIG. 9, the foregoing detection algorithm is performed on both a signaling symbol (that is, a first signaling symbol) at the $20^{th}$ μs to the $24^{th}$ μs (including the $20^{th}$ μs and the $24^{th}$) of a received data packet and a signaling symbol (that is, a second signaling symbol) at the $24^{th}$ μs to the $28^{th}$ μs (including the $24^{th}$ μs and the $28^{th}$) of the received data packet to calculate two metric values.

For example, in each signaling symbol, subcarriers numbered with −21, −7, 7, and 21 are pilot subcarriers, and a BPSK modulation scheme with rotation of 90 degrees, that is, QBPSK modulation, is used for all the four pilot subcarriers. For a modulation scheme of signaling subcarriers (or data subcarriers) in these two signaling symbols, no limitation is imposed by the embodiments, the BPSK may be used for modulation, or another modulation scheme may be used.

When pilot information of these two signaling symbols is modulated by using the BPSK scheme, the following operation result is obtained:

$$a_i = 1 \text{ or } a_i = -1, \text{ where } i = -21, -7, 7, 21$$

$$b_i = 0, \text{ where } i = -21, -7, 7, 21$$

$$S_{HEW-1} = \sum_{i=-21,-7,7,21} (a_i^2 - b_i^2) = 4$$

-continued $$S_{HEW-2} = \sum_{i=-21,-7,7,21} (a_i^2 - b_i^2) = 4$$

If a format of the data packet is a HEW format, HEW-SIG-A1 and HEW-SIG-A2 are sent at the $20^{th}$ μs to the $28^{th}$ μs (including the $20^{th}$ μs and the $28^{th}$) of the data packet, a modulation scheme that is used is a BPSK scheme with rotation of 90 degrees, that is, QBPSK, and the following operation result is obtained:

$$a_i = 1 \text{ or } a_i = -1, \text{ where } i = -21, -7, 7, 21$$

$$b_i = 0, \text{ where } i = -21, -7, 7, 21$$

$$S_{HEW-1} = \sum_{i=-21,-7,7,21} (a_i^2 - b_i^2) = -4$$

$$S_{HEW-2} = \sum_{i=-21,-7,7,21} (a_i^2 - b_i^2) = -4$$

In conclusion, the detector has the following possible output, as shown in Table 2:

TABLE 2

| | Output result of a detector | | | |
|---|---|---|---|---|
| Data packet format | Modulation scheme for pilot information | | Output of a detector | |
| | $20^{th}$ μs to $24^{th}$ μs | $24^{th}$ μs to $28^{th}$ μs | $S_1$ | $S_2$ |
| Legacy, HT, VHT | BPSK | BPSK | 4 | 4 |
| HEW | BPSK with rotation of 90 degrees | BPSK with rotation of 90 degrees | -4 | -4 |

840. The receive end compares a calculated metric value with a preset threshold.

It can be learned from Table 2 that the detector has different output for a HEW data packet format and other data packet formats, and therefore can accurately determine the format of the data packet according to a result of detection.

During implementation, S_HEW_1 and S_HEW_2 may be added and then a decision is made, or a decision may be separately performed, and the like. It can be learned from the result in Table 2 that, if the format of the data packet is determined by detecting a metric value of pilot information of one symbol, a threshold may be set to a value smaller than 4, for example, the threshold may be set to 0. If the format of the data packet is determined by detecting a sum of metric values of pilot information of two symbols, a threshold may be set to a value smaller than 8, for example, the threshold may be set to 4 or 0.

850. Determine a format of the data packet according to a result of the comparison.

For example, if the format of the data packet is determined by detecting a metric value of pilot information of one symbol, when it is detected that the foregoing metric value is smaller than 0, it can be determined that the format of the data packet is a HEW format. In a case in which the format of the data packet is determined by detecting a sum of metric values of pilot information of two symbols, when it is detected that the foregoing metric value is smaller than 0 or 4, it can be determined that the format of the data packet is a HEW format. Therefore, it can be determined, according to output of a detector, whether a received data packet is in the HEW format.

Figure 11:
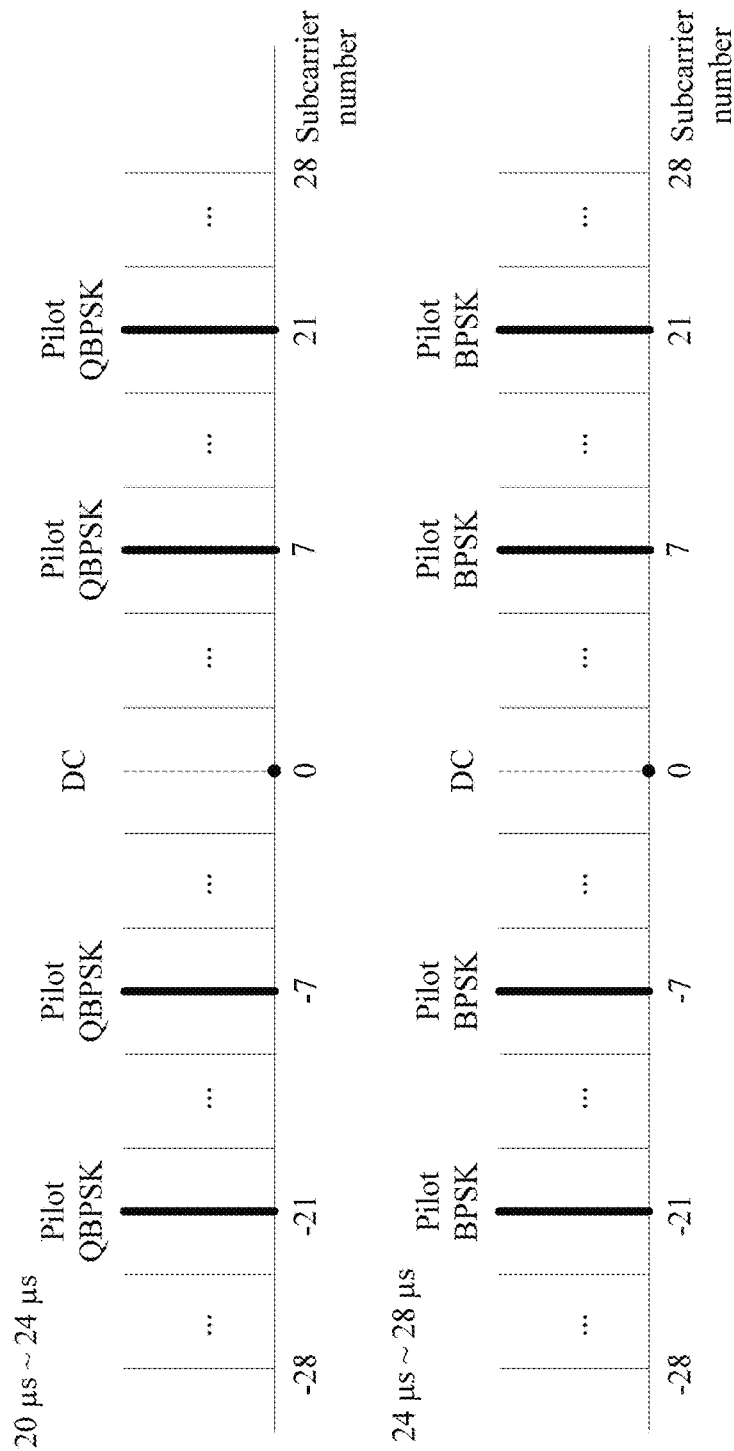
FIG. 11 is a schematic flowchart of distribution of pilot subcarriers according to another embodiment.

FIG. 11 is a schematic flowchart of distribution of pilot subcarriers according to another embodiment.

In this embodiment, a signal transmission process is similar to that in the embodiment of FIG. 8, and details are not described herein again. A difference from the embodiment of FIG. 8 is that, in this embodiment, a BPSK modulation scheme with rotation of 90 degrees (that is, a QBPSK modulation scheme) is used for four pilot subcarriers in a signaling symbol (that is, a first signaling symbol) at the $20^{th}$ μs to the $24^{th}$ μs (including the $20^{th}$ μs and the $24^{th}$) of a data packet, and a BPSK modulation scheme is used for four pilot subcarriers in a symbol (that is, a second signaling symbol) at the $24^{th}$ μs to the $28^{th}$ μs (including the $24^{th}$ μs and the $28^{th}$) of the data packet.

Figure 12:
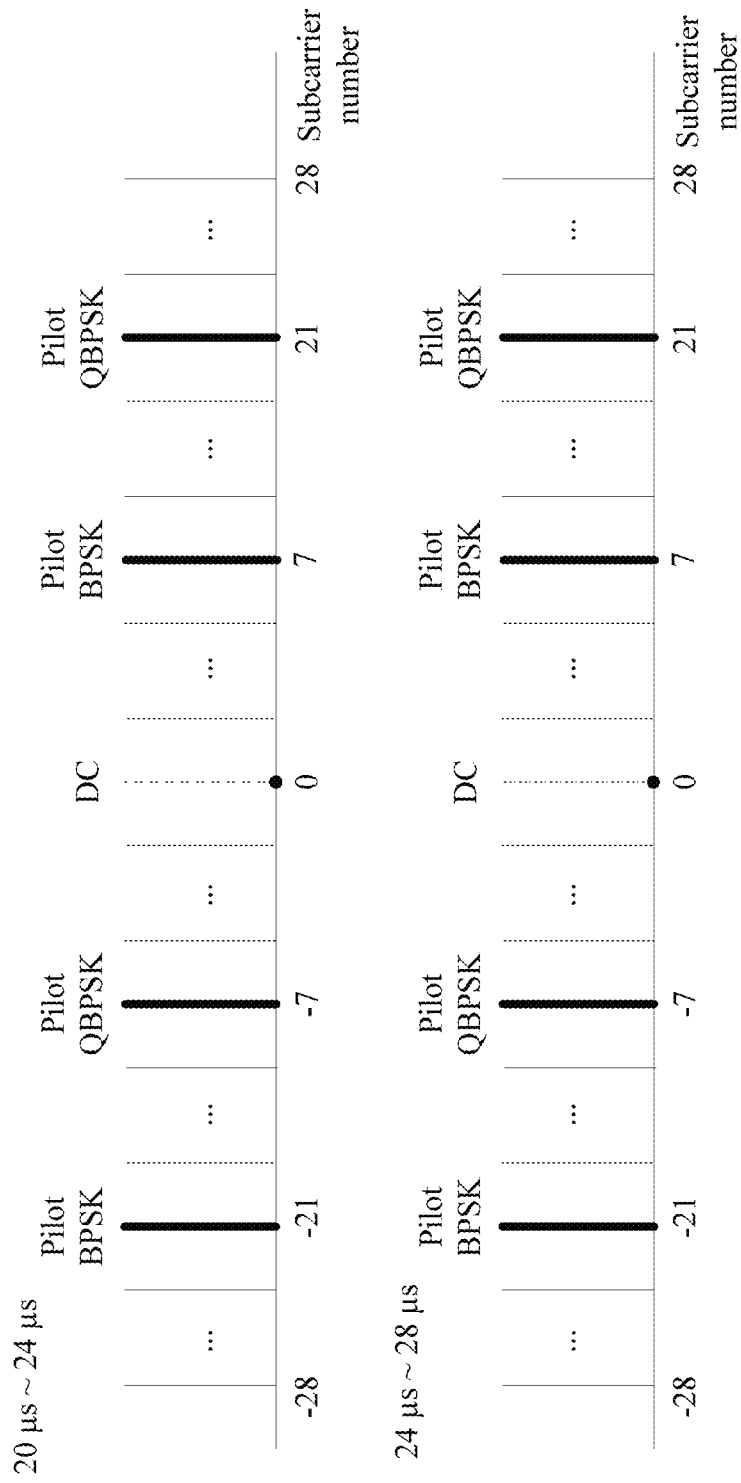
FIG. 12 is a schematic diagram of distribution of pilot subcarriers according to still another embodiment.

FIG. 12 is a schematic diagram of distribution of pilot subcarriers according to still another embodiment.

In this embodiment, a signal transmission process is similar to that in the embodiment of FIG. 8, and details are not described herein again. A difference from the embodiment of FIG. 8 is that, in this embodiment, a BPSK modulation scheme with rotation of 90 degrees (that is, a QBPSK modulation scheme) is used for pilot subcarriers -7 and 21 at the $20^{th}$ μs to the $24^{th}$ μs (including the $20^{th}$ μs and the $24^{th}$) (that is, a first signaling symbol) of a data packet, and a BPSK modulation scheme is used for pilot subcarriers -21 and 7; the BPSK modulation scheme with rotation of 90 degrees (that is, QBPSK modulation) is used for pilot subcarriers -7 and 21 at the $24^{th}$ μs to the $28^{th}$ μs (including the $24^{th}$ μs and the $28^{th}$) (that is, a second signaling symbol) of the data packet, and the BPSK modulation scheme is used for pilot subcarriers -21 and 7.

Figure 13:
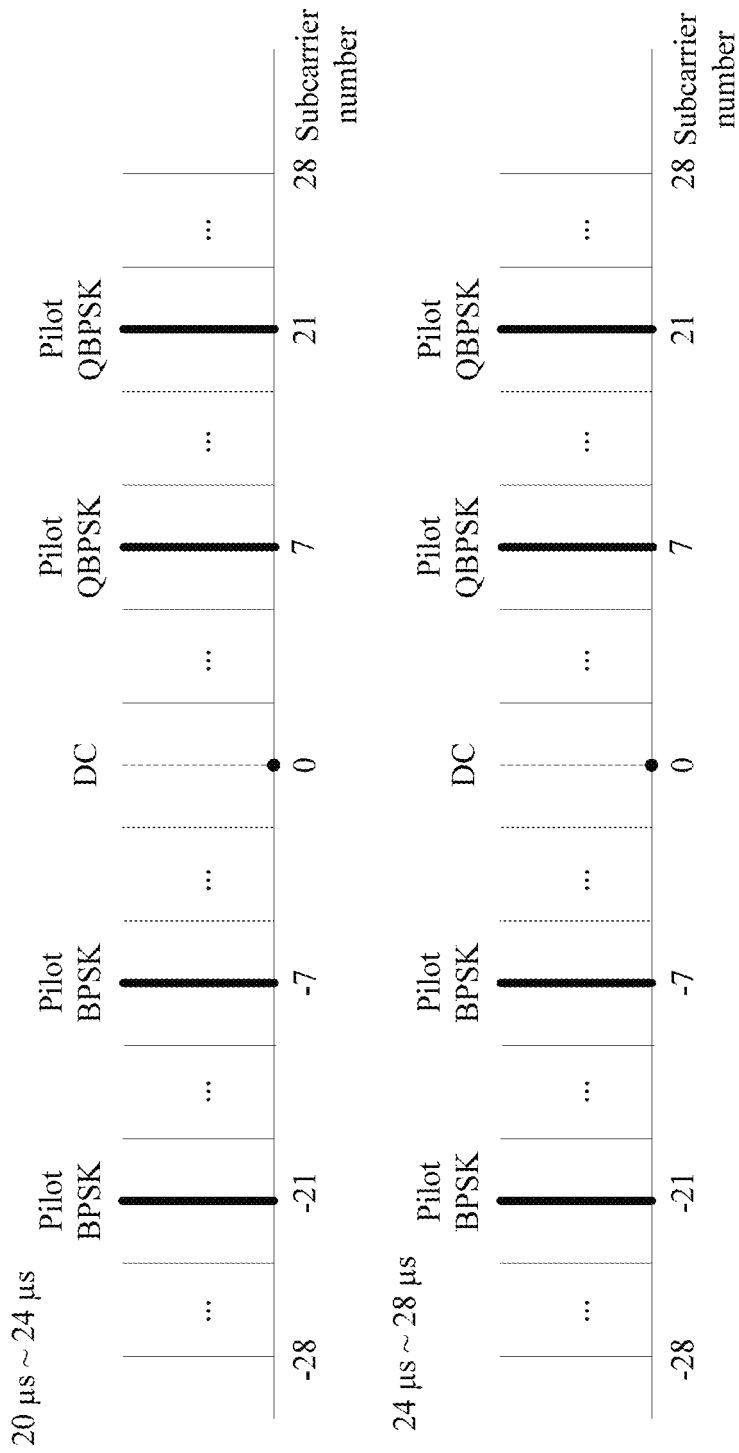
FIG. 13 is a schematic diagram of distribution of pilot subcarriers according to yet another embodiment.

FIG. 13 is a schematic diagram of distribution of pilot subcarriers according to yet another embodiment.

In this embodiment, a BPSK modulation scheme with rotation of 90 degrees (that is, a QBPSK modulation scheme) is used for pilot subcarriers 7 and 21 at the $20^{th}$ μs to the $24^{th}$ μs (including the $20^{th}$ μs and the $24^{th}$) (that is, a first signaling symbol) of a data packet, and a BPSK modulation scheme is used for pilot subcarriers -21 and -7; the BPSK modulation scheme with rotation of 90 degrees, that is, QBPSK modulation, is used for pilot subcarriers 7 and 21 at the $24^{th}$ μs to the $28^{th}$ μs (including the $24^{th}$ μs and the $28^{th}$) (that is, a second signaling symbol) of the data packet, and the BPSK modulation scheme is used for pilot subcarriers -21 and -7.

It should be understood that, in the embodiments of FIG. 11 to FIG. 13, for a modulation scheme of data subcarriers in the foregoing two signaling symbols, no limitation is imposed by the embodiments, a BPSK modulation scheme may be used for both, or another modulation scheme may be chosen. It should be further understood that, in the embodiments of FIG. 11 to FIG. 13, a detection method at a receive end is similar to that in the embodiment of FIG. 8. In addition, a person skilled in the art can derive, according to the detection method in the embodiment of FIG. 8, the detection algorithm in the embodiments of FIG. 11 to FIG. 13, and details are not described herein again.

It should be noted that, in this embodiment, a Wi-Fi system with bandwidth of 20 MHz is used as an example, and there are four pilot subcarriers, which are respectively located at subcarriers -21, -7, 7 and 21; if the bandwidth of the system is 40 MHz, there are 6 pilot subcarriers, which are respectively located at subcarriers -53, -25, -11, 11, 25 and 53; if the bandwidth of the system is 80 MHz, there are 8 pilot subcarriers, which are respectively located at subcarriers -103, -75, -39, -11, 11, 39, 75 and 103; and if the bandwidth of the system is 160 MHz, there are 16 pilot subcarriers, which are respectively located at subcarriers −231, −203, −167, −139, −117, −89, −53, −25, 25, 53, 89, 117, 139, 167, 203 and 231. For systems with different bandwidths, a signal transmission method is similar to the signal transmission method in the foregoing embodiment, and details are not described herein again.

It should be noted that a format may be determined merely according to pilot information, or may be determined by comprehensively using pilot information carried in a pilot subcarrier and signaling information carried in a data subcarrier. For example, if a modulation scheme for a data subcarrier in a signaling field of a data packet in a HEW format may differ from a modulation scheme for a data packet in another format, comprehensive determining may be performed by comprehensively using pilot information carried in a pilot subcarrier and signaling information carried in a data subcarrier, so as to improve a detection probability of a data packet format.

The modulation scheme for pilot information proposed may be applicable to a signaling field of a data packet in a HEW format, so that the data packet in the HEW format coexists with a data packet with legacy format, a data packet in a high rate format, and a data packet in a very high rate format that are in an existing Wi-Fi system, which does not affect detecting or determining, by a conventional user, an 802.11n standard user, and an 802.11ac standard user, a data packet in an existing format. In addition, in the method for detecting a data packet format proposed in the embodiments, a HEW user can accurately and conveniently determine a data packet in HEW format.

A signal transmission method according to an embodiment is described in the foregoing. With reference to the description of FIG. 14 to FIG. 17, the following describes a signal transmission device according to an embodiment.

Figure 14:
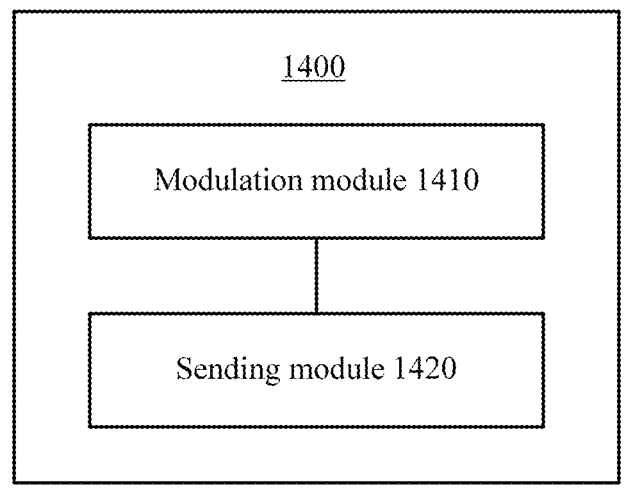
FIG. 14 is a signal transmission apparatus according to an embodiment.

FIG. 14 is a signal transmission apparatus 1400 according to an embodiment. The apparatus 1400 includes: a modulation module 1410 and a sending module 1420.

The modulation module 1410 is configured to modulate, by using a phase-shift keying PSK scheme with rotation of a first angle, at least a part of pilot information carried in at least one symbol of a data packet, to obtain modulated pilot information. The sending module 1420 is configured to send, to a receive end, a data packet that carries the modulated pilot information.

According to this embodiment, a transmit end may modulate, by using a PSK scheme with rotation of a preset angle, pilot information carried in a symbol of the data packet. A modulation scheme different from a conventional modulation scheme is used in this embodiment to modulate pilot information carried in a symbol of a data packet, so that a data packet format corresponding to the modulation scheme can be effectively detected at a receive end.

According to this embodiment, the modulation module 1410 modulates, by using a binary phase-shift keying BPSK scheme with rotation of the first angle, at least a part of the pilot information carried in the at least one symbol of the data packet, to obtain the modulated pilot information.

According to this embodiment, the modulation module 1410 modulates, by using the binary phase-shift keying BPSK scheme with rotation of the first angle, at least a part of pilot information carried in at least one signaling symbol in a signaling field of the data packet, to obtain the modulated pilot information.

According to this embodiment, the modulation module 1410 modulates, by using a binary phase-shift keying BPSK scheme with a rotation angle of $\beta_{i,j}$, pilot information carried in the $j^{th}$ pilot subcarrier in the $i^{th}$ signaling symbol in the signaling field of the data packet, where i=1, 2, 3 . . . I, j=1, 2, 3 . . . J, I is a quantity of signaling symbols in the data packet, J is a quantity of pilot subcarriers in each signaling symbol of the at least one signaling symbol, and at least one of the rotation angle $\beta_{i,j}$ is the first angle.

According to this embodiment, the modulation module 1410 modulates, by using the BPSK scheme with rotation of the first angle, all pilot information carried in one signaling symbol or two signaling symbols in the signaling field of the data packet.

According to this embodiment, the modulation module 1410 modulates, by using the BPSK scheme with rotation of the first angle, all pilot information carried in all signaling symbols in the signaling field of the data packet.

Optionally, in another embodiment, the modulation module 1410 modulates, by using the BPSK scheme with rotation of the first angle, a part of pilot information carried in each signaling symbol of the at least one signaling symbol, and modulates, by using a BPSK scheme with rotation of a second angle, another part of the pilot information carried in each signaling symbol of the at least one signaling symbol.

Optionally, in another embodiment, the modulation module 1410 further modulates, by using a BPSK scheme with rotation of a second angle, pilot information carried in another signaling symbol except the at least one signaling symbol in the signaling field of the data packet.

Optionally, in another embodiment, the modulation module 1410 modulates, by using a binary phase-shift keying BPSK scheme with rotation of 90 degrees, pilot information carried in a first signaling symbol, and modulates, by using a binary phase-shift keying BPSK scheme with rotation of 90 degrees, 45 degrees, or 0 degrees, pilot information carried in a second signaling symbol.

According to this embodiment, the first angle is N*45 degrees and N is a positive integer.

Optionally, in another embodiment, the modulation module 1410 further modulates, by using a binary phase-shift keying BPSK scheme with rotation of a third angle, at least a part of signaling information carried in the at least one signaling symbol in the signaling field of the data packet, to obtain modulated signaling information, and the sending module 1420 sends, to the receive end, a data packet that carries the modulated pilot information and the modulated signaling information.

For operations and functions of modules of the apparatus 1400, refer to the method in the foregoing FIG. 1. To avoid repetition, details are not described herein again.

Figure 15:
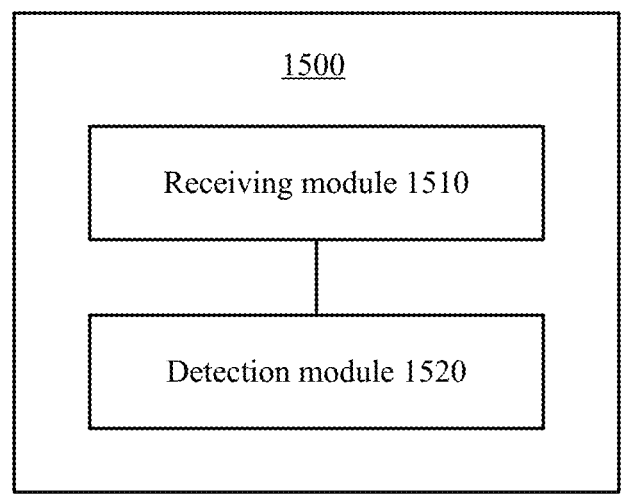
FIG. 15 is a signal transmission apparatus according to another embodiment.

FIG. 15 is a signal transmission apparatus 1500 according to another embodiment. The apparatus 1500 includes: a receiving module 1510 and a detection module 1520.

The receiving module 1510 is configured to receive a data packet sent by a transmit end, where a signaling field of the data packet carries modulated pilot information, and at least a part of pilot information carried in at least one symbol in the signaling field of the data packet is modulated by using a phase-shift keying PSK scheme with rotation of a first angle. The detection module 1520 is configured to detect the modulated pilot information to determine that a format of the data packet is a data packet format corresponding to the PSK scheme with rotation of the first angle.

According to this embodiment, a transmit end may modulate, by using a PSK scheme with rotation of a preset angle, pilot information carried in a symbol of a data packet. A modulation scheme different from a conventional modulation scheme is used in this embodiment to modulate pilot information carried in a symbol of a data packet, so that a data packet format corresponding to the modulation scheme can be effectively detected at a receive end.

According to this embodiment, the phase-shift keying scheme is a binary phase-shift keying BPSK scheme, where the detection module 1520 detects the modulated pilot information to determine that the format of the data packet is a data packet format corresponding to a BPSK scheme with rotation of the first angle.

According to this embodiment, the at least one symbol is at least one signaling symbol in the signaling field of the data packet.

According to this embodiment, the detection module 1520 detects a real part component and an imaginary part component of the pilot information and compares a result of the detection with a preset threshold to determine that the format of the data packet is the data packet format corresponding to the BPSK scheme with rotation of the first angle.

According to this embodiment, the detection module 1520 performs, according to the following formula, an operation on a real part and an imaginary part of modulated pilot information of one of the at least one signaling symbol carried in the signaling field of the data packet, to obtain the result of the detection:

$$S = \sum_{j=1}^{J} (a_j^2 - b_j^2),$$

where $a_j$ is a real part component of modulated pilot information carried in the $j^{th}$ pilot subcarrier in the $i^{th}$ signaling symbol, $b_j$ is an imaginary part component of the modulated pilot information carried in the $j^{th}$ pilot subcarrier in the $i^{th}$ signaling symbol, $j=1, 2, 3 \ldots J$, and J is a quantity of pilot subcarriers in each signaling symbol of the at least one signaling symbol; compares the result S of the detection with a first threshold; and if the result S of the detection is less than the first threshold, determines that the format of the data packet is the data packet format corresponding to the binary phase-shift keying scheme with rotation of the first angle.

According to this embodiment, pilot information carried in the $j^{th}$ pilot subcarrier in the $i^{th}$ signaling symbol in the signaling field of the data packet is modulated by using a binary phase-shift keying BPSK scheme with a rotation angle of $\beta_{i,j}$, where $i=1, 2, 3 \ldots I$, $j=1, 2, 3 \ldots J$, I is a quantity of signaling symbols in the data packet, J is a quantity of pilot subcarriers in each signaling symbol of the at least one signaling symbol, and at least one of the rotation angle $\beta_{i,j}$ is the first angle. The detection module 1520 performs, according to the following formula, an operation on a real part and an imaginary part of the modulated pilot information carried in the signaling field of the data packet, to obtain the result of the detection:

$$S = \sum_{i=1}^{I} \sum_{j=1}^{J} (a_{ij}^2 - b_{ij}^2),$$

where $a_{ij}$ is a real part component of modulated pilot information carried in the $j^{th}$ pilot subcarrier in the $i^{th}$ signaling symbol, and $b_{ij}$ is an imaginary part component of the modulated pilot information carried in the $j^{th}$ pilot subcarrier in the $i^{th}$ signaling symbol; compares the result S of the detection with a first threshold; and if the result S of the detection is less than the first threshold, determines that the format of the data packet is the data packet format corresponding to the binary phase-shift keying scheme with rotation of the first angle.

According to this embodiment, all pilot information carried in one signaling symbol or two signaling symbols in the signaling field of the data packet is modulated by using the BPSK scheme with rotation of the first angle.

According to this embodiment, all pilot information carried in all signaling symbols in the signaling field of the data packet is modulated by using the BPSK scheme with rotation of the first angle.

According to this embodiment, a part of pilot information carried in each signaling symbol of the at least one signaling symbol is modulated by using the BPSK scheme with rotation of the first angle, and another part of the pilot information carried in each signaling symbol of the at least one signaling symbol is modulated by using a BPSK scheme with rotation of a second angle.

According to this embodiment, pilot information carried in another signaling symbol except the at least one signaling symbol in the signaling field of the data packet is modulated by using a BPSK scheme with rotation of a second angle.

According to this embodiment, pilot information carried in a first signaling symbol in the signaling field of the data packet is modulated by using a binary phase-shift keying BPSK scheme with rotation of 90 degrees, and pilot information carried in a second signaling symbol in the signaling field of the data packet is modulated by using a binary phase-shift keying BPSK scheme with rotation of 90 degrees, 45 degrees, or 0 degrees.

According to this embodiment, the first angle is N*45 degrees and N is a positive integer.

Optionally, in another embodiment, the receiving module 1510 further receives a second data packet, where a signaling field of the second data packet carries pilot information modulated by using the binary phase-shift keying BPSK scheme; and detects the pilot information modulated by using the binary phase-shift keying BPSK scheme, to determine that a format of the second data packet is a data packet format corresponding to the BPSK scheme.

For operations and functions of modules of the apparatus 1500, refer to the method in the foregoing FIG. 4. To avoid repetition, details are not described herein again.

Figure 16:
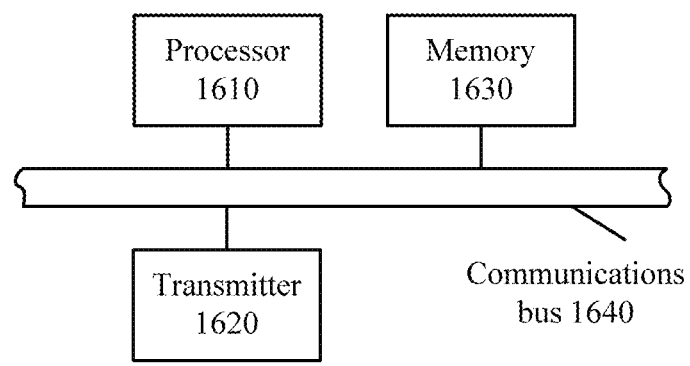
FIG. 16 is a signal transmission apparatus according to still another embodiment.

FIG. 16 is a signal transmission apparatus 1600 according to still another embodiment. The apparatus 1600 includes: a processor 1610, a transmitter 1620, a memory 1630, and a communications bus 1640.

The processor 1610 is configured to invoke code in the memory 1630 by using the communications bus 1640, modulate, by using a phase-shift keying PSK scheme with rotation of a first angle, at least a part of pilot information carried in at least one symbol of a data packet, to obtain modulated pilot information. The transmitter 1620 is configured to send, to a receive end, a data packet that carries the modulated pilot information.

According to this embodiment, a transmit end may modulate, by using a PSK scheme with rotation of a preset angle, pilot information carried in a symbol of a data packet. A modulation scheme different from a conventional modulation scheme is used in this embodiment to modulate pilot information carried in a symbol of a data packet, so that a data packet format corresponding to the modulation scheme can be effectively detected at a receive end.

According to this embodiment, the processor 1610 modulates, by using a binary phase-shift keying BPSK scheme with rotation of the first angle, at least a part of the pilot information carried in the at least one symbol of the data packet, to obtain the modulated pilot information.

According to this embodiment, the processor 1610 modulates, by using the binary phase-shift keying BPSK scheme with rotation of the first angle, at least a part of pilot information carried in at least one signaling symbol in a signaling field of the data packet, to obtain the modulated pilot information.

According to this embodiment, the processor 1610 modulates, by using a binary phase-shift keying BPSK scheme with a rotation angle of $\beta_{i,j}$, pilot information carried in the $j^{th}$ pilot subcarrier in the $i^{th}$ signaling symbol in the signaling field of the data packet, where i=1, 2, 3 . . . I, j=1, 2, 3 . . . J, I is a quantity of signaling symbols in the data packet, J is a quantity of pilot subcarriers in each signaling symbol of the at least one signaling symbol, and at least one of the rotation angle $\beta_{i,j}$ is the first angle.

According to this embodiment, the processor 1610 modulates, by using the BPSK scheme with rotation of the first angle, all pilot information carried in one signaling symbol or two signaling symbols in the signaling field of the data packet.

According to this embodiment, the processor 1610 modulates, by using the BPSK scheme with rotation of the first angle, all pilot information carried in all signaling symbols in the signaling field of the data packet.

Optionally, in another embodiment, the processor 1610 modulates, by using the BPSK scheme with rotation of the first angle, a part of pilot information carried in each signaling symbol of the at least one signaling symbol, and modulates, by using a BPSK scheme with rotation of a second angle, another part of the pilot information carried in each signaling symbol of the at least one signaling symbol.

Optionally, in another embodiment, the processor 1610 further modulates, by using a BPSK scheme with rotation of a second angle, pilot information carried in another signaling symbol except the at least one signaling symbol in the signaling field of the data packet.

Optionally, in another embodiment, the processor 1610 modulates, by using a binary phase-shift keying BPSK scheme with rotation of 90 degrees, pilot information carried in a first signaling symbol, and modulates, by using a binary phase-shift keying BPSK scheme with rotation of 90 degrees, 45 degrees, or 0 degrees, pilot information carried in a second signaling symbol.

According to this embodiment, the first angle is N*45 degrees and N is a positive integer.

Optionally, in another embodiment, the processor 1610 further modulates, by using a binary phase-shift keying BPSK scheme with rotation of a third angle, at least a part of signaling information carried in the at least one signaling symbol in the signaling field of the data packet, to obtain modulated signaling information, and the transmitter 1620 sends, to the receive end, a data packet that carries the modulated pilot information and the modulated signaling information.

For operations and functions of modules of the apparatus 1600, refer to the method in the foregoing FIG. 1. To avoid repetition, details are not described herein again.

Figure 17:
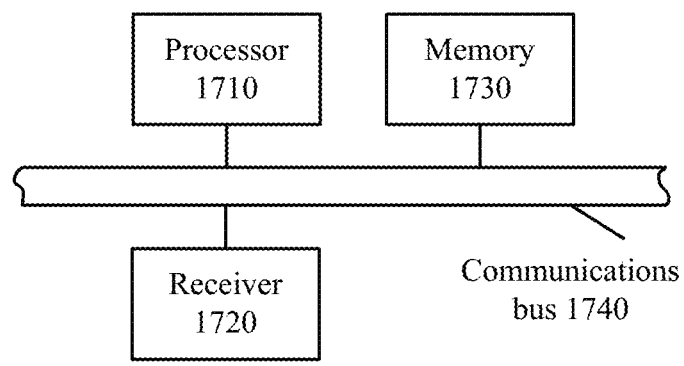
FIG. 17 is a signal transmission apparatus according to yet another embodiment.

FIG. 17 is a signal transmission apparatus 1700 according to yet another embodiment. The apparatus 1700 includes: a processor 1710, a receiver 1720, a memory 1730, and a communications bus 1740.

The receiver 1720 is configured to receive a data packet sent by a transmit end, where a signaling field of the data packet carries modulated pilot information, and at least a part of pilot information carried in at least one symbol in the signaling field of the data packet is modulated by using a phase-shift keying PSK scheme with rotation of a first angle. The processor 1710 is configured to detect the modulated pilot information to determine that a format of the data packet is a data packet format corresponding to the PSK scheme with rotation of the first angle.

According to this embodiment, a transmit end may modulate, by using a PSK scheme with rotation of a preset angle, pilot information carried in a symbol of the data packet. A modulation scheme different from a conventional modulation scheme is used in this embodiment to modulate pilot information carried in a symbol of a data packet, so that a data packet format corresponding to the modulation scheme can be effectively detected at a receive end.

According to this embodiment, the phase-shift keying scheme is a binary phase-shift keying BPSK scheme, where the processor 1710 detects the modulated pilot information to determine that the format of the data packet is a data packet format corresponding to a BPSK scheme with rotation of the first angle.

According to this embodiment, the at least one symbol is at least one signaling symbol in the signaling field of the data packet.

According to this embodiment, the processor 1710 detects a real part component and an imaginary part component of the pilot information and compares a result of the detection with a preset threshold to determine that the format of the data packet is the data packet format corresponding to the BPSK scheme with rotation of the first angle.

According to this embodiment, the processor 1710 performs, according to the following formula, an operation on a real part and an imaginary part of modulated pilot information of one of the at least one signaling symbol carried in the signaling field of the data packet, to obtain the result of the detection:

$$S = \sum_{j=1}^{J} \left(a_j^2 - b_j^2\right),$$

where $a_j$ is a real part component of modulated pilot information carried in the $j^{th}$ pilot subcarrier in the $i^{th}$ signaling symbol, $b_j$ is an imaginary part component of the modulated pilot information carried in the $j^{th}$ pilot subcarrier in the $i^{th}$ signaling symbol, j=1, 2, 3 . . . J, and J is a quantity of pilot subcarriers in each signaling symbol of the at least one signaling symbol; compares the result S of the detection with a first threshold; and if the result S of the detection is less than the first threshold, determines that the format of the data packet is the data packet format corresponding to the binary phase-shift keying scheme with rotation of the first angle.

According to this embodiment, pilot information carried in the $j^{th}$ pilot subcarrier in the $i^{th}$ signaling symbol in the signaling field of the data packet is modulated by using a binary phase-shift keying BPSK scheme with a rotation angle of $\beta_{i,j}$, where i=1, 2, 3 . . . I, j=1, 2, 3 . . . J, I is a quantity of signaling symbols in the data packet, J is a quantity of pilot subcarriers in each signaling symbol of the at least one signaling symbol, and at least one of the rotation angle $\beta_{i,j}$ is the first angle. The processor 1710 performs, according to the following formula, an operation on a real part and an imaginary part of the modulated pilot information carried in the signaling field of the data packet, to obtain the result of the detection:

$$S = \sum_{i=1}^{I} \sum_{j=1}^{J} (a_{ij}^2 - b_{ij}^2),$$

where $a_{ij}$ is a real part component of modulated pilot information carried in the $j^{th}$ pilot subcarrier in the $i^{th}$ signaling symbol, and $b_{ij}$ is an imaginary part component of the modulated pilot information carried in the $j^{th}$ pilot subcarrier in the $i^{th}$ signaling symbol; compares the result S of the detection with a first threshold; and if the result S of the detection is less than the first threshold, determines that the format of the data packet is the data packet format corresponding to the binary phase-shift keying scheme with rotation of the first angle.

According to this embodiment, all pilot information carried in one signaling symbol or two signaling symbols in the signaling field of the data packet is modulated by using the BPSK scheme with rotation of the first angle.

According to this embodiment, all pilot information carried in all signaling symbols in the signaling field of the data packet is modulated by using the BPSK scheme with rotation of the first angle.

According to this embodiment, a part of pilot information carried in each signaling symbol of the at least one signaling symbol is modulated by using the BPSK scheme with rotation of the first angle, and another part of the pilot information carried in each signaling symbol of the at least one signaling symbol is modulated by using a BPSK scheme with rotation of a second angle.

According to this embodiment, pilot information carried in another signaling symbol except the at least one signaling symbol in the signaling field of the data packet is modulated by using a BPSK scheme with rotation of a second angle.

According to this embodiment, pilot information carried in a first signaling symbol in the signaling field of the data packet is modulated by using a binary phase-shift keying BPSK scheme with rotation of 90 degrees, and pilot information carried in a second signaling symbol in the signaling field of the data packet is modulated by using a binary phase-shift keying BPSK scheme with rotation of 90 degrees, 45 degrees, or 0 degrees.

According to this embodiment, the first angle is N*45 degrees and N is a positive integer.

Optionally, in another embodiment, the receiver 1720 further receives a second data packet, where a signaling field of the second data packet carries pilot information modulated by using the binary phase-shift keying BPSK scheme; and detects the pilot information modulated by using the binary phase-shift keying BPSK scheme, to determine that a format of the second data packet is a data packet format corresponding to the BPSK scheme.

For operations and functions of modules of the apparatus 1700, refer to the method in the foregoing FIG. 4. To avoid repetition, details are not described herein again.

For the embodiments, simulation testing is further performed, where a result of the testing shows that the modulation solution and the detection method proposed in the embodiments can obtain a relatively lower false detection rate.

According to the embodiments, a receive end can be enabled to accurately, rapidly and effectively distinguish a data packet in HEW format from data packets in different formats (legacy format, high rate format, very high rate format, and HEW format). The embodiments can be applied in a wireless local area network of a HEW standard and compatible with an existing Wi-Fi standard, without affecting IEEE 802.11a/11b/11g, IEEE 802.11n, and IEEE 802.11ac standard users. No matter a modulation solution for a transmit end or a detection algorithm for a receive end, they are easy to implement, low-cost, and applicable to large-scale promotion.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners, but are not intended to limit the protection scope. Any variation or replacement readily figured out by a person skilled in the art within the technical scope disclosed in the present invention shall fall within the protection scope. Therefore, the protection scope shall be subject to the protection scope of the claims.

What is claimed is:

1. A signal transmission method, comprising:
modulating, by using a phase-shift keying (PSK) scheme with rotation of a first angle, at least a part of pilot information carried in at least one signaling symbol in a signaling field after a legacy signaling field of a physical layer conformance procedure (PLCP) protocol data unit (PPDU) frame of a data packet, to obtain modulated pilot information, wherein the data packet is in a high efficiency wireless local area network (HEW) format, and wherein the PSK scheme is part of a data packet modulation scheme selected such that an operation result of an operation performed on the at least one signaling symbol falling below a preset threshold indicates, to a receive end, that the data packet is in the HEW format, wherein the operation is:

$$\sum_{i}^{N}(a_i^2 - b_i^2),$$

where N is a quantity of pilot subcarriers that carry the pilot information in each of the at least one signaling symbol, i is a subcarrier number for a pilot subcarrier in the at least one signaling symbol, $a_i$ is a real part of pilot information in a subcarrier i, and $b_i$ is an imaginary part of the pilot information in the subcarrier i; and
sending, to the receive end, the data packet that carries the modulated pilot information.

2. The method according to claim 1, wherein the modulating, by using the PSK scheme with the rotation of the first angle, at least the part of the pilot information carried in the at least one signaling symbol of the data packet comprises:
modulating, by using a binary phase-shift keying (BPSK) scheme with the rotation of the first angle, at least the part of the pilot information carried in the at least one signaling symbol of the data packet, to obtain the modulated pilot information.

3. The method according to claim 2, wherein the modulating, by using the BPSK scheme with the rotation of the first angle, at least the part of the pilot information carried in the at least one signaling symbol of the data packet, to obtain the modulated pilot information comprises:
modulating, by using the BPSK scheme with rotation of the first angle, at least the part of pilot information carried in the at least one signaling symbol in the signaling field of the data packet, to obtain the modulated pilot information.

4. The method according to claim 3, wherein the modulating, by using the BPSK scheme with the rotation of the first angle, at least the part of the pilot information carried in the at least one signaling symbol in the signaling field of the data packet comprises:
modulating, by using the BPSK scheme with the rotation of the first angle, the part of the pilot information carried in each signaling symbol of the at least one signaling symbol, and
wherein the method further comprises:
modulating, by using a BPSK scheme with rotation of a second angle, another part of the pilot information carried in each signaling symbol of the at least one signaling symbol, wherein the BPSK scheme with the rotation of the second angle is part of the data packet modulation scheme.

5. The method according to claim 3, further comprising:
modulating, by using a BPSK scheme with rotation of a second angle, pilot information carried in another signaling symbol other than the at least one signaling symbol in the signaling field of the data packet, wherein the BPSK scheme with the rotation of the second angle is part of the data packet modulation scheme.

6. The method according to claim 5, wherein the modulating, by using the BPSK scheme with rotation of the first angle, at least the part of the pilot information carried in the at least one signaling symbol in the signaling field of the data packet comprises:
modulating, by using the BPSK scheme with rotation of 90 degrees, pilot information carried in a first signaling symbol; and
wherein the modulating, by using the BPSK scheme with rotation of the second angle, the pilot information carried in the another signaling symbol comprises:
modulating, by using the BPSK scheme with rotation of 90 degrees, 45 degrees, or 0 degrees, the pilot information carried in a second signaling symbol.

7. The method according to claim 3, wherein the modulating, by using the BPSK scheme with the rotation of the first angle, at least the part of the pilot information carried in the at least one signaling symbol in the signaling field of the data packet comprises:
modulating, by using the BPSK scheme with a rotation angle of $\beta_{i,j}$, pilot information carried in the $j^{th}$ pilot subcarrier in the $i^{th}$ signaling symbol in the signaling field of the data packet, wherein i=1, 2, 3 . . . I, j=1, 2, 3 . . . J, I is a quantity of signaling symbols in the data packet, J is a quantity of pilot subcarriers in each signaling symbol of the at least one signaling symbol, and at least one of the rotation angle $\beta_{i,j}$ is the first angle.

8. The method according to claim 3, further comprising:
modulating, by using the BPSK scheme with rotation of a third angle, at least a part of signaling information carried in the at least one signaling symbol in the signaling field of the data packet, to obtain modulated signaling information;
wherein the data packet sent to the receive end carries the modulated pilot information and the modulated signaling information.

9. The method according to claim 1, wherein the first angle is N*45 degrees and N is a positive integer.

10. A method, comprising:
receiving a data packet sent by a transmit end, wherein the data packet carries modulated pilot information, and at least a part of pilot information carried in at least one symbol that is in signaling fields after a legacy signaling field of a physical layer conformance procedure (PLCP) protocol data unit (PPDU) frame of the data packet is modulated by using a packet modulation scheme that includes a phase-shift keying (PSK) scheme with rotation of a first angle; and
detecting the packet modulation scheme of the data packet including the modulated pilot information to determine that a format of the data packet is a high efficiency wireless local area network (HEW) data packet format corresponding to the packet modulation scheme including the PSK scheme with rotation of the first angle by applying an operation on the at least one symbol, wherein a result of the operation falling below a preset threshold indicates that the data packet is in the HEW format, wherein the operation is:

$$\Sigma_i^N(a_i^2 - b_i^2),$$

where N is a quantity of pilot subcarriers that carry the pilot information in each of the at least one symbol, i is a subcarrier number for a pilot subcarrier in the at least one symbol, $a_i$ is a real part of pilot information in a subcarrier i, and $b_i$ is an imaginary part of the pilot information in the subcarrier i.

11. The method according to claim 10, wherein the phase-shift keying scheme is a binary phase-shift keying (BPSK) scheme; and
wherein the detecting the modulated pilot information to determine that the format of the data packet is the data packet format corresponding to the PSK scheme with rotation of the first angle comprises:
detecting the modulated pilot information to determine that the format of the data packet is a data packet format corresponding to the BPSK scheme with rotation of the first angle.

12. A signal transmission apparatus, comprising:
a processor;
a non-transitory computer-readable storage medium storing a program to be executed by the processor, the program including instructions to:
modulate, by using a phase-shift keying (PSK) scheme with rotation of a first angle, at least a part of pilot information carried in at least one signaling symbol in a signaling field after a legacy signaling field of a physical layer conformance procedure (PLCP) protocol data unit (PPDU) frame of a data packet, to obtain modulated pilot information, wherein the data packet is in a high efficiency wireless local area network (HEW) format, and wherein the PSK scheme is part of a data packet modulation scheme selected such that an operation result of an operation performed on the at least one signaling symbol falling below a preset threshold indicates, to a receive end, that the data packet is in the HEW format, wherein the operation is:

$$\sum_i^N (a_i^2 - b_i^2),$$

where N is a quantity of pilot subcarriers that carry the pilot information in each of the at least one signaling symbol, i is a subcarrier number for a pilot subcarrier in the at least one signaling symbol, $a_i$ is a real part of pilot information in a subcarrier i, and $b_i$ is an imaginary part of the pilot information in the subcarrier i; and
a transmitter, configured to send, to the receive end, the data packet that carries the modulated pilot information.

13. The apparatus according to claim 12, wherein the instructions to modulate at least the part of the pilot information comprise instructions to modulate, by using a binary phase-shift keying (BPSK) scheme with the rotation of the first angle, at least the part of the pilot information carried in the at least one signaling symbol of the data packet, to obtain the modulated pilot information.

14. The apparatus according to claim 13, wherein the instructions to modulate, by using the BPSK scheme with the rotation of the first angle comprise instructions to modulate, by using the BPSK scheme with the rotation of the first angle, at least the part of the pilot information carried in the at least one signaling symbol in the signaling field of the data packet, to obtain the modulated pilot information.

15. The apparatus according to claim 14, wherein the instructions to modulate, by using the BPSK scheme with the rotation of the first angle, at least the part of the pilot information carried in the at least one signaling symbol in the signaling field of the data packet comprise instructions to modulate, by using the BPSK scheme with the rotation of the first angle, a part of pilot information carried in each signaling symbol of the at least one signaling symbol, and to modulate, by using the BPSK scheme with rotation of a second angle, another part of the pilot information carried in each signaling symbol of the at least one signaling symbol, wherein the BPSK scheme with the rotation of the second angle is part of the data packet modulation scheme.

16. The apparatus according to claim 14, wherein the instructions to modulate, by using the BPSK scheme with rotation of the first angle further comprises instructions to modulate, by using a BPSK scheme with the rotation of a second angle, pilot information carried in another signaling symbol except the at least one signaling symbol in the signaling field of the data packet, wherein the BPSK scheme with the rotation of the second angle is part of the data packet modulation scheme.

17. The apparatus according to claim 16, wherein the instructions to modulate, by using the BPSK scheme with the rotation of the first angle, the part of pilot information carried in each signaling symbol of the at least one signaling symbol comprises instructions to modulate, by using a binary phase-shift keying (BPSK) scheme with rotation of 90 degrees, pilot information carried in a first signaling symbol, and to modulate, by using a binary phase-shift keying (BPSK) scheme with rotation of 90 degrees, 45 degrees, or 0 degrees, pilot information carried in a second signaling symbol.

18. The apparatus according to claim 14, wherein the instructions to modulate, by using the BPSK scheme with rotation of the first angle, at least the part of the pilot information carried in the at least one signaling symbol in the signaling field of the data packet comprise instructions to modulate, by using a BPSK scheme with a rotation angle of $\beta_{i,j}$, pilot information carried in the $j^{th}$ pilot subcarrier in the $i^{th}$ signaling symbol in the signaling field of the data packet, wherein i=1, 2, 3 ... I, j=1, 2, 3 ... J, I is a quantity of signaling symbols in the data packet, J is a quantity of pilot subcarriers in each signaling symbol of the at least one signaling symbol, and at least one of the rotation angle $\beta_{i,j}$ is the first angle.

19. The apparatus according to claim 14, wherein the instructions further include instructions to modulate, by using the BPSK scheme with rotation of a third angle, at least a part of signaling information carried in the at least one signaling symbol in the signaling field of the data packet, to obtain modulated signaling information, wherein the transmitter sends, to the receive end, the data packet that carries the modulated pilot information and the modulated signaling information.

20. A device, comprising:
a receiver, configured to receive a data packet sent by a transmit end, wherein a signaling field that is in signaling fields after a legacy signaling field of a physical layer conformance procedure (PLCP) protocol data unit (PPDU) frame of the data packet carries modulated pilot information, and at least a part of pilot information carried in at least one symbol in the signaling field of the data packet is modulated by using a packet modulation scheme that includes a phase-shift keying (PSK) scheme with rotation of a first angle; and a processor; and a non-transitory computer-readable storage medium storing a program to be executed by the processor, the program including instructions to:

detect the packet modulation scheme of the data packet including the modulated pilot information to determine that a format of the data packet is a high efficiency wireless local area network (HEW) data packet format corresponding to the packet modulation scheme including the PSK scheme with rotation of the first angle by applying an operation on the at least one symbol in the signaling field, wherein a result of the operation falling below a preset threshold indicates that the data packet is in the HEW format, wherein the operation is:

$$\sum_{i}^{N}(a_i^2 - b_i^2),$$

where N is a quantity of pilot subcarriers that carry the pilot information in each of the at least one symbol in the signaling field, wherein i is a subcarrier number for a pilot subcarrier in the at least one symbol in the signaling field, $a_i$ is a real part of pilot information in a subcarrier i, and $b_i$ is an imaginary part of the pilot information in the subcarrier i.

\* \* \* \* \*